(12) United States Patent
Yamanoi et al.

(10) Patent No.: US 9,946,439 B2
(45) Date of Patent: Apr. 17, 2018

(54) DISPLAY DEVICE AND NON-TRANSITORY COMPUTER READABLE RECORDING MEDIUM

(71) Applicant: KONICA MINOLTA, INC., Chiyoda-ku (JP)

(72) Inventors: Yuta Yamanoi, Toyonaka (JP); Akira Kubo, Amagasaki (JP); Kouta Wada, Osaka (JP); Masahiro Muraoka, Osaka (JP)

(73) Assignee: KONICA MINOLTA, INC., Tokyo (JP)

( * ) Notice: Subject to any disclaimer, the term of this patent is extended or adjusted under 35 U.S.C. 154(b) by 180 days.

(21) Appl. No.: 14/900,507

(22) PCT Filed: Jun. 5, 2014

(86) PCT No.: PCT/JP2014/064907
§ 371 (c)(1),
(2) Date: Dec. 21, 2015

(87) PCT Pub. No.: WO2014/203737
PCT Pub. Date: Dec. 24, 2014

(65) Prior Publication Data
US 2018/0046329 A1    Feb. 15, 2018

(30) Foreign Application Priority Data

Jun. 21, 2013   (JP) .................................. 2013-130188

(51) Int. Cl.
*G06F 3/048* (2013.01)
*G06F 3/0482* (2013.01)
(Continued)

(52) U.S. Cl.
CPC .............. *G06F 3/0482* (2013.01); *G01J 3/50* (2013.01); *G09G 5/14* (2013.01); *G09G 2340/145* (2013.01); *G09G 2354/00* (2013.01)

(58) Field of Classification Search
CPC ....................................................... G06F 3/0482
(Continued)

(56) References Cited

U.S. PATENT DOCUMENTS

2013/0198609 A1\*   8/2013   Mokhtarzada .......... G06F 3/048
715/234

FOREIGN PATENT DOCUMENTS

JP           4-223236         8/1992
JP         2008-092219        9/2006
(Continued)

*Primary Examiner* — William Titcomb
(74) *Attorney, Agent, or Firm* — Cozen O'Connor

(57) ABSTRACT

A display device includes a storage storing a plurality of rules including first and second rules, a designator that designates one rule of the plurality of rules, and a controller that causes a screen to transition from one screen to another screen in accordance with the one rule. The first rule includes a rule that causes a screen to transition from a first screen to a second screen in response to a user's first action, and a rule that causes a screen to transition from the first screen to a third screen in response to a user's second action. The second rule includes a rule that causes a screen to transition from the first screen to the second screen in response to a user's third action, and a rule that causes a screen to transition from the second screen to the third screen in response to the user's third action.

19 Claims, 14 Drawing Sheets

(51) Int. Cl.
  *G09G 5/14* (2006.01)
  *G01J 3/50* (2006.01)
(58) Field of Classification Search
  USPC .......................................................... 715/853
  See application file for complete search history.

(56) References Cited

FOREIGN PATENT DOCUMENTS

| JP | 2008-242964 | 10/2008 |
| JP | 2012-32880 | 2/2012 |
| JP | 2012-133470 | 7/2012 |

* cited by examiner

FIG. 5

|        | MAIN | MENU A | MENU A1 | MENU A2 | MENU B | MENU B1 | MENU B2 |
|--------|------|--------|---------|---------|--------|---------|---------|
| MAIN | | ACTION A | — | — | ACTION B | — | — |
| MENU A | ACTION L | | ACTION A1 | ACTION A2 | — | — | — |
| MENU A1 | — | ACTION L | | — | — | — | — |
| MENU A2 | — | ACTION L | — | | — | — | — |
| MENU B | ACTION L | — | — | — | | ACTION B1 | ACTION B2 |
| MENU B1 | — | — | — | — | ACTION L | | — |
| MENU B2 | — | — | — | — | ACTION L | — | |

FIG. 6

|        | MAIN | MENU A | MENU A1 | MENU A2 | MENU B | MENU B1 | MENU B2 |
|--------|------|--------|---------|---------|--------|---------|---------|
| MAIN | | ACTION A | — | — | ACTION B | — | — |
| MENU A | ACTION L | | ACTION D | ACTION U | — | — | — |
| MENU A1 | ACTION L | ACTION U | | ACTION D | — | — | — |
| MENU A2 | ACTION L | ACTION D | ACTION U | | — | — | — |
| MENU B | ACTION L | — | — | — | | ACTION D | ACTION U |
| MENU B1 | ACTION L | — | — | — | ACTION U | | ACTION D |
| MENU B2 | ACTION L | — | — | — | ACTION D | ACTION U | |

FIG. 7

|        | MAIN | MENU A | MENU A1 | MENU A2 | MENU B | MENU B1 | MENU B2 |
|--------|------|--------|---------|---------|--------|---------|---------|
| MAIN | | ACTION D | — | — | — | — | ACTION U |
| MENU A | ACTION U | | ACTION D | — | — | — | — |
| MENU A1 | — | ACTION U | | ACTION D | — | — | — |
| MENU A2 | — | — | ACTION U | | ACTION D | — | — |
| MENU B | — | — | — | ACTION U | | ACTION D | — |
| MENU B1 | — | — | — | — | ACTION U | | ACTION D |
| MENU B2 | ACTION D | — | — | — | — | ACTION U | |

F I G. 1 5
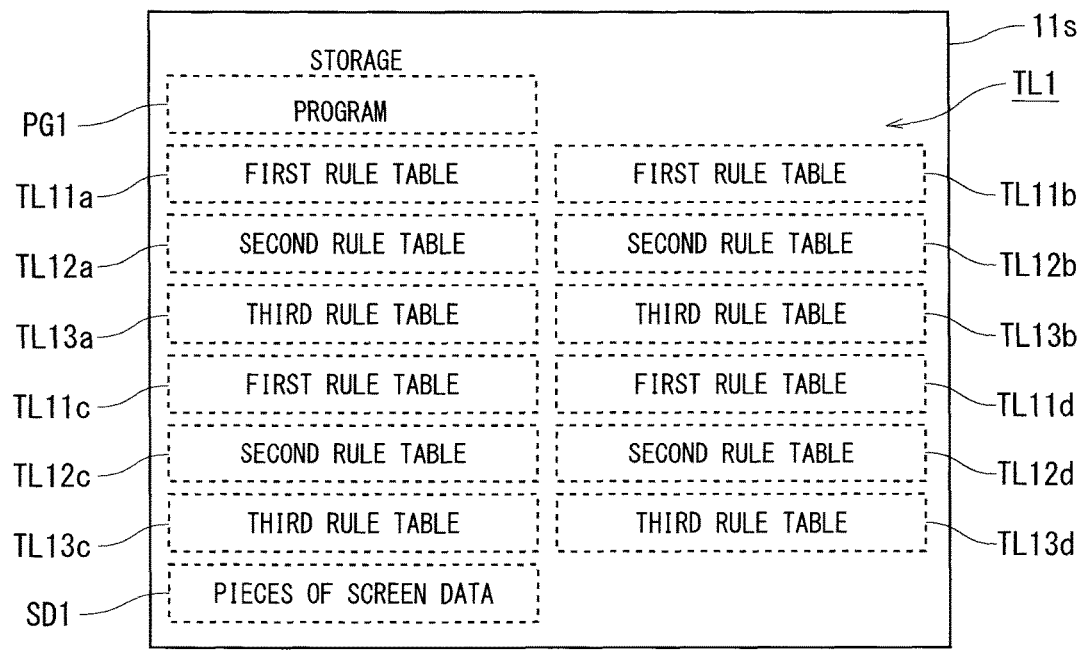

F I G. 2 3
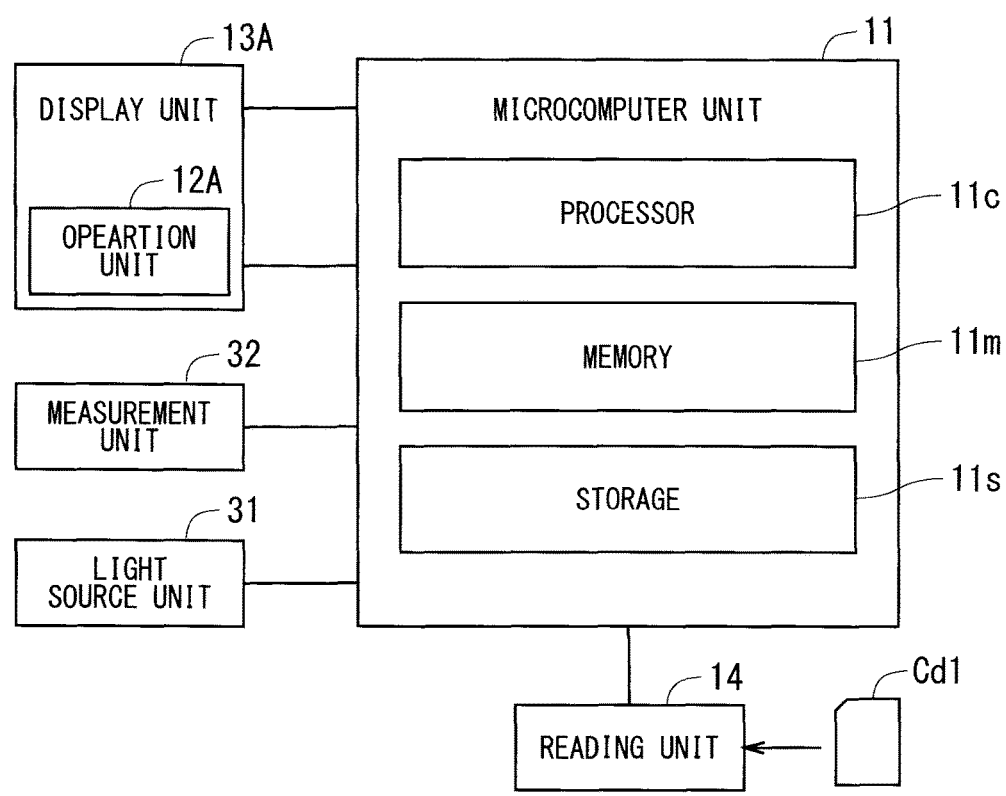

DISPLAY DEVICE AND NON-TRANSITORY COMPUTER READABLE RECORDING MEDIUM

RELATED APPLICATIONS

This is a U.S. National Phase Application under 35 USC 371 of International Application PCT/JP2014/064907 filed on Jun. 5, 2014.

This application claims the priority of Japanese application no. 2013-130188 filed Jun. 21, 2013, the entire content of which is hereby incorporated by reference.

TECHNICAL FIELD

The present invention relates to a display device and a non-transitory computer readable recording medium.

BACKGROUND ART

Colorimeters that quantitatively measure the colors of measurement objects such as vehicles and foods are well known and are in use. The colorimeter is provided with a display unit that displays, for example, the contents of functions and operations as well as measurement results.

Downsizing the colorimeter for greater portability leads to reductions in the size and resolution of the display unit. In this case, for example, there is employed a configuration in which a screen transition is performed between a plurality of screens that are layered to be dendritically associated.

Specifically, in an example technology, associated ones of the functions displayed in a display unit are gathered and grouped in a hierarchical structure of three layers, namely, a higher layer (higher hierarchy), an intermediate layer (intermediate hierarchy), and a lower layer (lower hierarchy), and each function is executed by a switch operation (for example, see Japanese Patent Application Laid-Open No. 2008-92219). In this technology, for example, a screen is displayed that presents a plurality of options belonging to the higher hierarchy, and when one of the options is selected on the screen, a screen is displayed that presents a plurality of options belonging to the intermediate hierarchy for the one selected option. When, for example, one option is selected on the screen that presents the plurality of options belonging to the intermediate hierarchy, a screen is displayed that presents a plurality of options belonging to the lower hierarchy for the one selected option.

SUMMARY OF THE INVENTION

Problem to be Solved by the Invention

In the technology of Japanese Patent Application Laid-Open No. 2008-92219, unfortunately, items for a plurality of associated functions are presented together. Thus, only a user who has a good knowledge about a colorimeter can perform a screen transition between a plurality of layered screens to rapidly find an item for a desired function. Such a problem is common to display devices in general which have a small display unit with a limited amount of information that can be displayed at one time.

The present invention has been made in view of the problem above, and therefore has an object to provide a display technology capable of easily and rapidly finding a desired item in a small display unit.

Means to Solve the Problem

To solve the problem above, a display device according to a first aspect includes a display unit, a storage, a designation unit, and a display controller. The storage stores a plurality of pieces of screen data and information indicative of a plurality of screen transition rules including a first screen transition rule and a second screen transition rule. The designation unit designates, in response to a signal input in accordance with an action of a user, one screen transition rule of the plurality of screen transition rules. The display controller causes, in response to a signal input in accordance with an action of the user, a screen displayed in the display unit to transition from a screen based on one piece of screen data of the plurality of pieces of screen data to a screen based on another piece of screen data different from the one piece of screen data on the basis of the one screen transition rule designated by the designation unit. The plurality of pieces of screen data include first screen data, second screen data, and third screen data. The first screen transition rule includes (1a) a rule that causes, with a first screen based on the first screen data displayed in the display unit, a screen displayed in the display unit to transition from the first screen to a second screen based on the second screen data by the display controller in response to a signal input in accordance with a first action by the user, and (1b) a rule that causes, with the first screen displayed in the display unit, a screen displayed in the display unit to transition from the first screen to a third screen based on the third screen data by the display controller in response to a signal input in accordance with a second action different from the first action by the user. The second screen transition rule includes (2a) a rule that causes, with the first screen displayed in the display unit, a screen displayed in the display unit to transition from the first screen to the second screen by the display controller in response to a signal input in accordance with a third action by the user, and (2b) a rule that causes, with the second screen displayed in the display unit, a screen displayed in the display unit to transition from the second screen to the third screen by the display controller in response to a signal input in accordance with the third action by the user.

According to a second aspect, in the display device according to the first aspect, the first screen transition rule includes (1c) a rule that sets one screen of a top hierarchy of two or more hierarchies as a starting screen and causes, with one screen based on screen data of one hierarchy of the two or more hierarchies displayed in the display unit, a screen displayed in the display unit to transition from the one screen to another screen based on screen data of another hierarchy immediately below the one hierarchy of the two or more hierarchies by the display controller in response to a signal input in accordance with an action of the user. The second screen transition rule includes (2c) a rule that causes a screen displayed in the display unit to transition by the display controller in response to a signal input in accordance with the third action by the user such that all screens based on all pieces of screen data belonging to the two or more hierarchies are displayed sequentially.

According to a third aspect, in the display device according to the first or second aspect, the plurality of pieces of screen data include fourth screen data, fifth screen data, and sixth screen data. The first screen transition rule further includes (1d) a rule that causes, with a fourth screen based on the fourth screen data displayed in the display unit, a screen displayed in the display unit to transition from the fourth screen to a fifth screen based on the fifth screen data by the display controller in response to a signal input in accordance with a fourth action by the user, and (1e) a rule that causes, with the fourth screen displayed in the display unit, a screen displayed in the display unit to transition from the fourth screen to a sixth screen based on the sixth screen data by the display controller in response to a signal input in accordance with a fifth action different from the fourth action by the user. The second screen transition rule includes (2d) a rule that causes, with the fourth screen displayed in the display unit, a screen displayed in the display unit to transition from the fourth screen to the fifth screen by the display controller in response to a signal input in accordance with the third action by the user, and (2e) a rule that causes, with the fifth screen displayed in the display unit, a screen displayed in the display unit to transition from the fifth screen to the sixth screen by the display controller in response to a signal input in accordance with the third action by the user. The second screen transition rule further includes (2f) a rule that causes, with any one screen of a first screen group including the first screen and the fourth screen displayed in the display unit, a screen displayed in the display unit to transition by the display controller in response to a signal input in accordance with a preset action by the user such that two or more screens constituting the first screen group are displayed sequentially, (2g) a rule that causes, with any one screen of a second screen group including the second screen and the fifth screen displayed in the display unit, a screen displayed in the display unit to transition by the display controller in response to a signal input in accordance with a preset action by the user such that two or more screens constituting the second screen group are displayed sequentially, and (2h) a rule that causes, with any one screen of a third screen group including the third screen and the sixth screen displayed in the display unit, a screen displayed in the display unit to transition by the display controller in response to a signal input in accordance with a preset action by the user such that two or more screens constituting the third screen group are displayed sequentially.

According to a fourth aspect, in the display device according to any one of the first to third aspects, the display unit includes an operation unit that outputs a signal corresponding to an action of the user to the designation unit and the display controller.

According to a fifth aspect, the display device according to any one of the first to fourth aspects includes an operation unit that outputs a signal corresponding to an action of the user to the designation unit and the display controller.

A non-transitory computer readable recording medium according to a six aspect is a medium storing a computer-readable program, the program controlling a display device to operate as one display device, and the one display device includes a display unit, a storage, a designation unit, and a display controller. The storage stores a plurality of pieces of screen data and information indicative of a plurality of screen transition rules including a first screen transition rule and a second screen transition rule. The designation unit designates, in response to a signal input in accordance with an action of a user, one screen transition rule of the plurality of screen transition rules. The display controller causes, in response to a signal input in accordance with an action of the user, a screen displayed in the display unit to transition from a screen based on one piece of screen data of the plurality of pieces of screen data to a screen based on another piece of screen data different from the one piece of screen data on the basis of the one screen transition rule designated by the designation unit. The plurality of pieces of screen data include first screen data, second screen data, and third screen data. The first screen transition rule includes (1a) a rule that causes, with a first screen based on the first screen data displayed in the display unit, a screen displayed in the display unit to transition from the first screen to a second screen based on the second screen data by the display controller in response to a signal input in accordance with a first action by the user, and (1b) a rule that causes, with the first screen displayed in the display unit, a screen displayed in the display unit to transition from the first screen to a third screen based on the third screen data by the display controller in response to a signal input in accordance with a second action different from the first action by the user. The second screen transition rule includes (2a) a rule that causes, with the first screen displayed in the display unit, a screen displayed in the display unit to transition from the first screen to the second screen by the display controller in response to a signal input in accordance with a third action by the user, and (2b) a rule that causes, with the second screen displayed in the display unit, a screen displayed in the display unit to transition from the second screen to the third screen by the display controller in response to a signal input in accordance with the third action by the user.

Effects of the Invention

The display device according to any of the first to fifth aspects can easily and rapidly find a desired item in a small display unit.

The display device according to the third aspect can, for example, check corresponding screens while comparing them.

The display device according to the fourth aspect, for example, does not require an operation unit provided separately from the display unit, leading to downsizing of the display device.

The display device according to the fifth aspect can, for example, downsize a display unit.

The non-transitory computer readable recording medium according to the sixth aspect can achieve similar effects to those of the display device according to the first aspect.

BRIEF DESCRIPTION OF DRAWINGS

FIG. 5 shows a specific example of a first rule table.

FIG. 6 shows a specific example of a second rule table.

FIG. 7 shows a specific example of a third rule table.

FIG. 15 shows an example of information stored in a storage 11s according to a first modification.

FIG. 23 is a block diagram showing a functional configuration of a colorimeter according to a modification.

DESCRIPTION OF EMBODIMENTS

Figure 1:
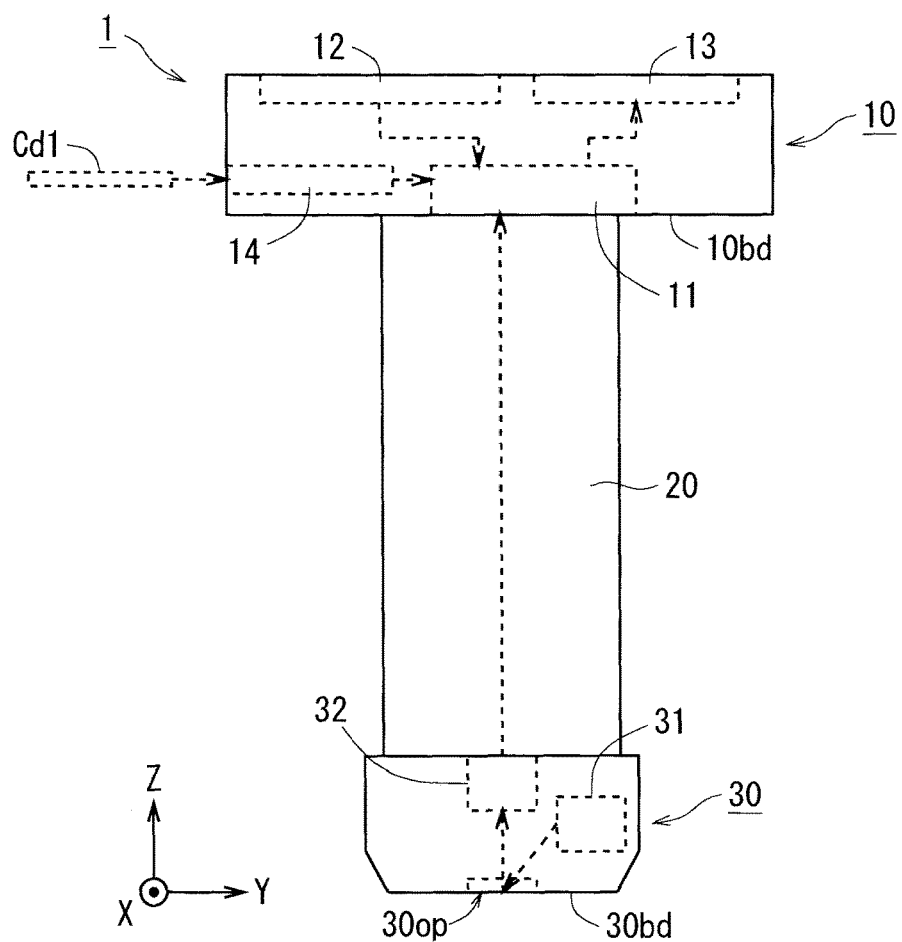
FIG. 1 schematically shows an external appearance of a colorimeter according to an embodiment.

The following will describe an embodiment and modifications of the present invention with reference to the drawings. It should be noted that components having a similar configuration and function bear the same reference sign in the drawings, and repetitive description is avoided below. A right-handed XYZ coordinate system is added to FIGS. 1 and 2, where the direction in which a connecting portion 20 extends is a ±Z direction.

(1) Embodiment

<(1-1) Configuration of Colorimeter>

Figure 2:
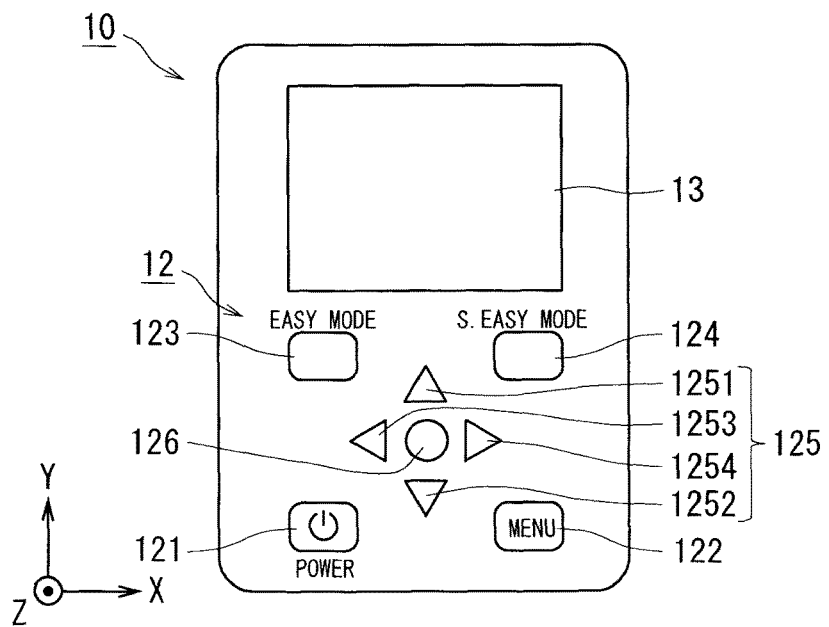
FIG. 2 is a plan view schematically showing an external appearance of a control unit according to the embodiment.

FIG. 1 schematically shows an external appearance of a colorimeter 1 according to an embodiment. As shown in FIG. 1, the colorimeter 1 includes a control unit 10, the connecting portion 20, and a measurement unit 30. FIG. 2 is a plan view showing the control unit 10 seen from the +Z direction.

The control unit 10 includes a housing 10bd, as well as a microcomputer unit, an operation unit 12, a display unit 13, and a reading unit 14 provided in the housing 10bd.

The housing 10bd has, for example, a substantially cubic shape. In the present embodiment, the microcomputer unit 11 is provided in the housing 10bd. The operation unit 12 and the display unit 13 are provided on one main surface of the housing 10bd in the +Z direction, and the reading unit 14 is provided in the side portion of the housing 10bd in a −Y direction. The microcomputer unit 11 controls the actions of the display unit 13, the reading unit 14, the measurement unit 30, and the like in response to a signal input from the operation unit 12. The operation unit 12 accepts an operation performed by the user of the colorimeter 1 and then outputs a signal corresponding to the operation to the microcomputer unit 11. The display unit 13 displays various screens through control by the microcomputer unit 11. The reading unit 14 is, for example, a portion to which a storage medium Cd1 is removably attached. The storage medium Cd1 may be, for example, a memory card. The microcomputer unit 11 causes the reading unit 14 to read various types of information stored in the storage medium Cd1 and write the various types of information to the storage medium Cd1.

The connecting portion 20 connects the control unit 10 and the measurement unit 30. The connecting portion 20 has, for example, a substantially cylindrical shape extending in the Z direction. The connecting portion 20 is grasped by, for example, a user of the colorimeter 1.

The measurement unit 30 includes a housing 30bd, as well as a light source unit 31 and a measurement unit 32 provided in the housing 30bd.

The housing 30bd has, for example, a substantially cubic shape. On one main surface of the housing 30bd in the −Z direction is provided an opening 30op. The opening 30op has, for example, a configuration in which a transparent plate member is fitted into an opening provided in the housing 30bd. The transparent plate member may be, for example, a glass plate. In measurement of the color of a measurement object by the colorimeter 1, the housing 30bd is caused to abut the measurement object so as to close the opening 30op.

The light source unit 31 emits the light (also referred to as illumination light) of a predetermined color set in advance. The predetermined color may be, for example, white. For example, for the light source unit 31b formed of a xenon lamp or an LED, the light source unit 31 can emit white light. The light source unit 31 emits illumination light through control by the microcomputer unit 11, and the illumination light is radiated to a measurement object through the opening 30op.

The measurement unit 32 receives the light (also referred to as "measurement light") emitted from the measurement object, which is obtained as a result of the radiation of the illumination light from the light source unit 31 to the measurement object, through the control by the microcomputer unit 11 to measure the characteristics of the measurement light. When the measurement light is the reflected light from the measurement object, for example, the measurement unit 32 receives the reflected light after dispersion to obtain data on the spectral spectrum of the reflected light. The reflected light may be dispersed by, for example, a diffraction grating. Herein, the reflected light after the dispersion may be received by, for example, a CCD having linearly arranged pixels. Then, the measurement unit 32 can obtain optical characteristics of the measurement object on the basis of, for example, the spectral characteristics of the measurement light and the wavelength spectrum of the illumination light emitted from the light source unit 31. The data indicative of the optical characteristics of the measurement object obtained by the measurement unit 32 is sent to the microcomputer unit 11.

As shown in FIG. 2, the operation unit 12 and the display unit 13 are disposed on one main surface of the control unit 10 in the +Z direction. When the size of the display unit 13 is limited in accordance with the size of the control unit 10, the colorimeter 1 serves as a display device including a small display unit 13.

The operation unit 12 includes buttons 121 to 124, a cross button 125, and an OK button 126. The button 121 is a button (also referred to as a power button) for activating the colorimeter 1 through a power supply from a power supply unit such as a battery (not shown). The button 122 is a button (also referred to as a menu button) for causing the display unit 13 to display various menus. The button 123 serves as a button for slightly simplifying the transition of screens (also referred to as display screens) displayed in the display unit 13. The button 124 serves as a button for considerably simplifying the transition of display screens displayed in the display unit 13. The cross button 125 includes an UP button 1251, a DOWN button 1252, a LEFT button 1253, and a RIGHT button 1254. The OK button 126 serves as a button for determining the selection of various options and the like on the display screen of the display unit 13.

The display unit 13 displays various screens. The display unit 13 may be, for example, a liquid crystal display having a plurality of pixels arranged in matrix. For example, a plurality of pixels may be arranged in matrix as follows: a first predetermined number of pixels are arranged in the X direction as a lateral direction, and a second predetermined number of pixels are arranged in the Y direction as a longitudinal direction. In one conceivable way, the first predetermined number is 320, and the second predetermined number is 240.

Figure 3:
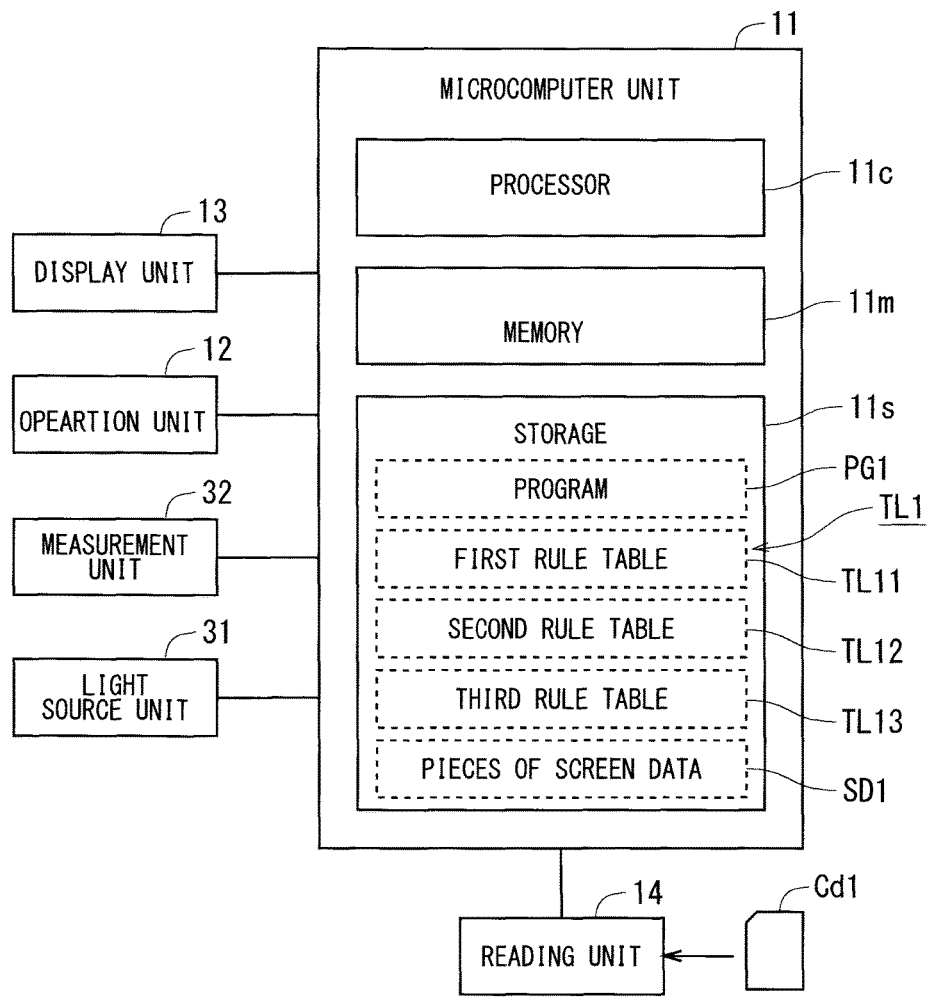
FIG. 3 is a block diagram showing a functional configuration of the colorimeter according to the embodiment.

FIG. 3 is a block diagram showing a functional configuration of the colorimeter 1. As shown in FIG. 3, the microcomputer unit 11 is connected with the operation unit 12, the display unit 13, the reading unit 14, the light source unit 31, and the measurement unit 32.

The microcomputer unit 11 mainly includes a processor 11c, a memory 11m, and a storage 11s. The storage 11s stores, for example, a program PG1, a plurality of rule tables TL1, and various types of data such as a plurality of pieces of screen data SD1. The various functions in the microcomputer unit 11 are executed by the processor 11c executing the program PG1. That is to say, the processor 11c executes the program PG1, so that the various functions in the colorimeter 1 as a display device are executed.

The plurality of rule tables TL1 are the information indicative of the rules (also referred to as screen transition rules) defining the transition of display screens to be displayed in the display unit 13. In the present embodiment, the plurality of rule tables TL1 include first to third rule tables TL11 to TL13. That is to say, the first rule table TL11 is the information indicative of a rule (also referred to as a normal screen transition rule) defining a normal transition of display screens to be displayed in the display unit 13. The second rule table TL12 is the information indicative of a rule (also referred to as a simple screen transition rule) defining a simple transition of display screens to be displayed in the display unit 13. The third rule table TL13 is the information indicative of a rule (also referred to as an all-screens sequential transition rule) defining a very simple transition of display screens to be displayed in the display unit 13.

The plurality of pieces of screen data SD1 are data indicative of display screens to be displayed in the display unit 13.

Figure 4:
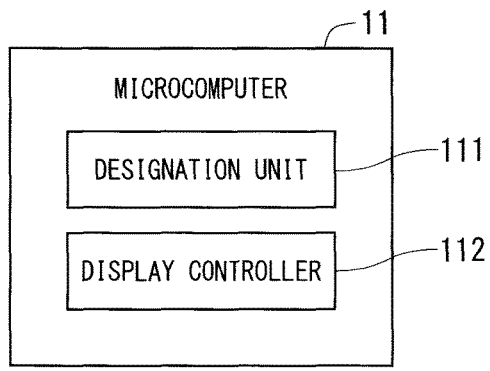
FIG. 4 is a block diagram showing a functional configuration achieved by a processor.

FIG. 4 shows a functional configuration achieved in the microcomputer unit 11 by the processor 11c executing the program PG1. As shown in FIG. 4, the microcomputer unit 11 includes a designation unit 111 and a display controller 112 as the functional configuration.

The designation unit 111 selectively designates one screen transition rule of the plurality of rule tables TL1 each indicative of the screen transition rule, in response to a signal input in accordance with the operation performed on the operation unit 12 by the user. Specifically, any one rule table of the first to third rule tables TL11 to TL13 is designated. Designating one rule table is achieved by, for example, a specific operation performed on the operation unit 12 by the user. For example, when the specific operation is simply pressing the button 121 as a power button, the first rule table TL11 is designated. For example, when the specific operation is an operation of pressing the button 121 with the button 123 pressed, the second rule table TL12 is designated. For example, when the specific operation is an operation of pressing the button 121 with the button 124 pressed, the third rule table TL13 is designated.

The display controller 112 controls a display of the screen in the display unit 13. For example, in response to a signal input in accordance with the operation performed on the operation unit 12 by the user, the display controller 112 causes a display screen displayed in the display unit 13 to transition on the basis of one screen transition rule designated by the designation unit 111. Specifically, the display controller 112 causes a transition from a screen based on one piece of screen data of the plurality of pieces of screen data SD1 to a screen based on another piece of screen data different from the one piece of screen data.

<(1-2) Screen Transition Rule>

FIGS. 5 to 7 show specific examples of the respective rule tables TL1. FIG. 5 shows a specific example of the first rule table TL11 defining the normal screen transition rule. FIG. 6 shows a specific example of the second rule table TL12 defining the simple screen transition rule. FIG. 7 shows a specific example of the third rule table TL13 defining the all-screens sequential transition rule. Each of the rule tables TL11 to TL13 describes an action required for the transition of display screens of the display unit 13. Illustrated herein are examples in which any one screen of a main screen G1m, a menu A screen G1a, a menu A1 screen Ga1, a menu A2 screen Ga2, a menu B screen G1b, a menu B1 screen Gb1, and a menu B2 screen Gb2 is displayed in the display unit 13.

Specifically, as shown in FIGS. 5 to 7, actions for transition to the screens with the names, described in the higher edge in order from left to right, are described with the screens with the names, described in the left edge in order from top to bottom, displayed in the display unit 13. Herein, an action A indicates an action of selecting a menu A; an action B indicates an action of selecting a menu B; an action L indicates an action of pressing the LEFT button 1253; an action A1 indicates an action of selecting the menu A1; and an action A2 indicates an action of selecting a menu A2. Similarly, an action B1 indicates an action of selecting a menu B1; an action B2 indicates an action of selecting a menu B2; an action U indicates an action of pressing the UP button 1251; and an action D indicates an action of pressing the DOWN button 1252. For example, FIG. 5 describes that the action of causing a display screen to transition from the main screen G1m to the menu A screen G1a is the action A, and the operation of causing a display screen to transition from the main screen G1m to the menu B screen G1b is the action B.

Herein, the plurality of pieces of screen data SD1 include main screen data, menu A screen data, menu A1 screen data, menu A2 screen data, menu B screen data, menu B1 screen data, and menu B2 screen data. The main screen G1m is displayed in the display unit 13 on the basis of the main screen data. The menu A screen G1a is displayed in the display unit 13 on the basis of the menu A screen data, the menu A1 screen Ga1 is displayed in the display unit 13 on the basis of the menu A1 screen data, and the menu A2 screen Ga2 is displayed in the display unit 13 on the basis of the menu A2 screen data. The menu B screen G1b is displayed in the display unit 13 on the basis of the menu B screen data, the menu B1 screen Gb1 is displayed in the display unit 13 on the basis of the menu B1 screen data, and the menu B2 screen Gb2 is displayed in the display unit 13 on the basis of the menu B2 screen data.

Figure 8:
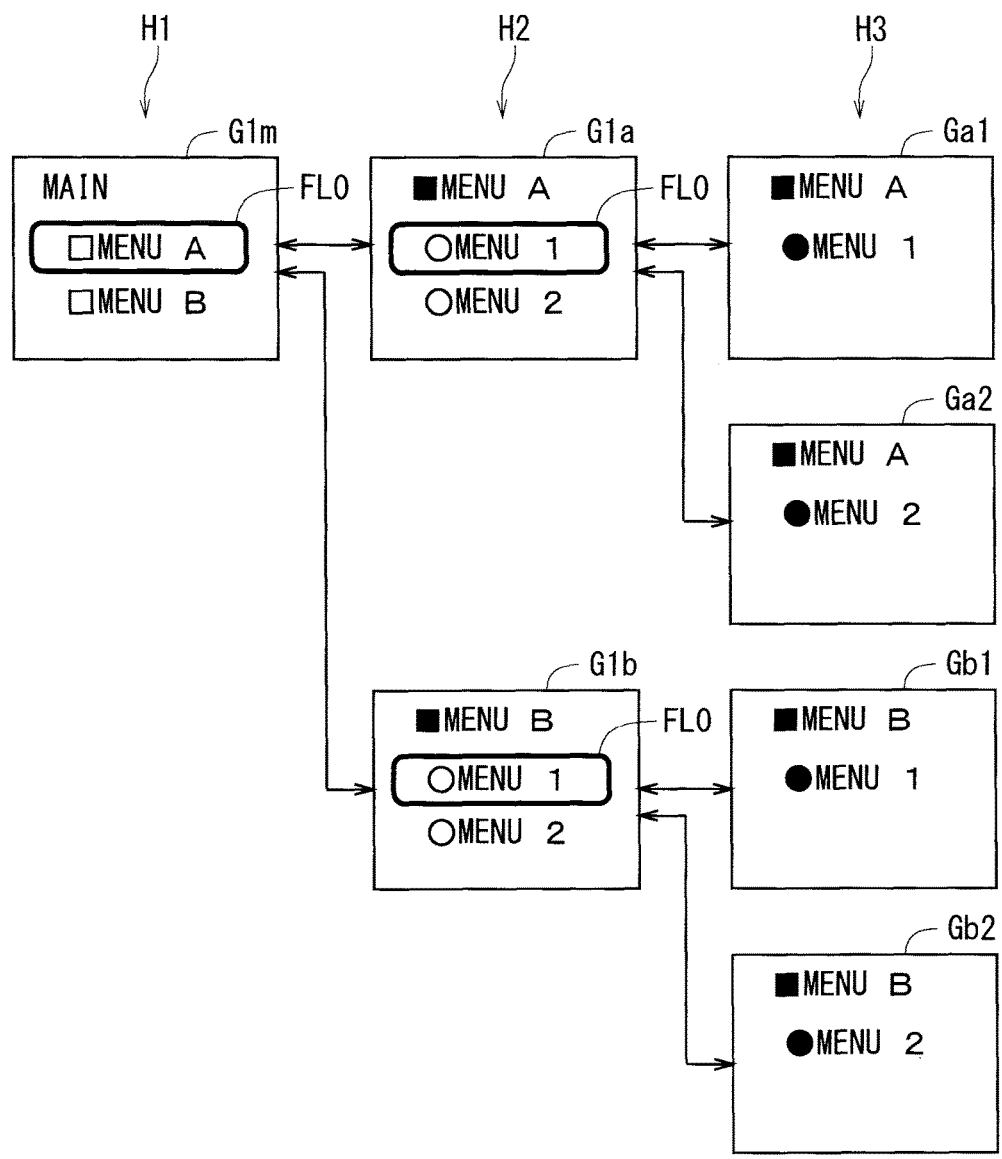
FIG. 8 shows an example of how a display screen transitions in accordance with a normal screen transition rule.
Figure 9:
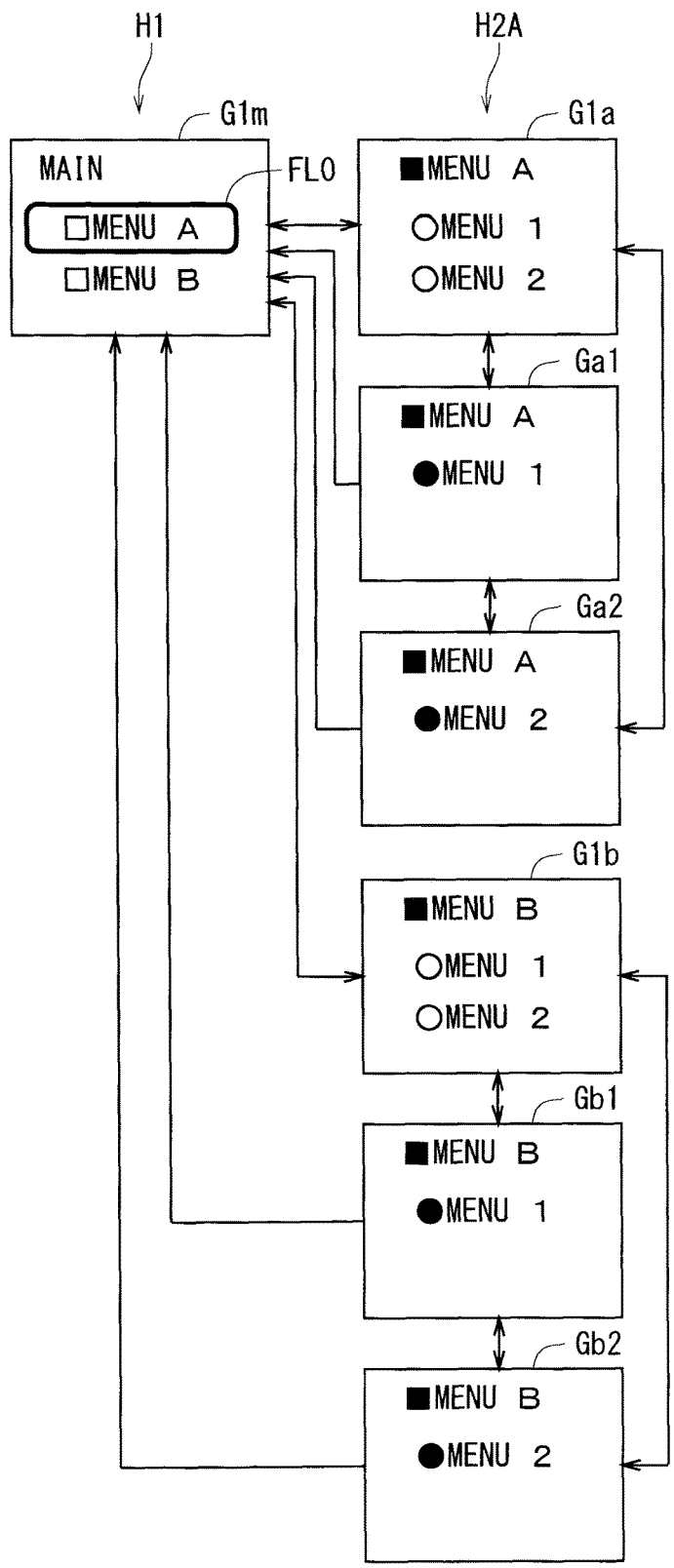
FIG. 9 shows an example of how a display screen transitions in accordance with a simple screen transition rule.
Figure 10:
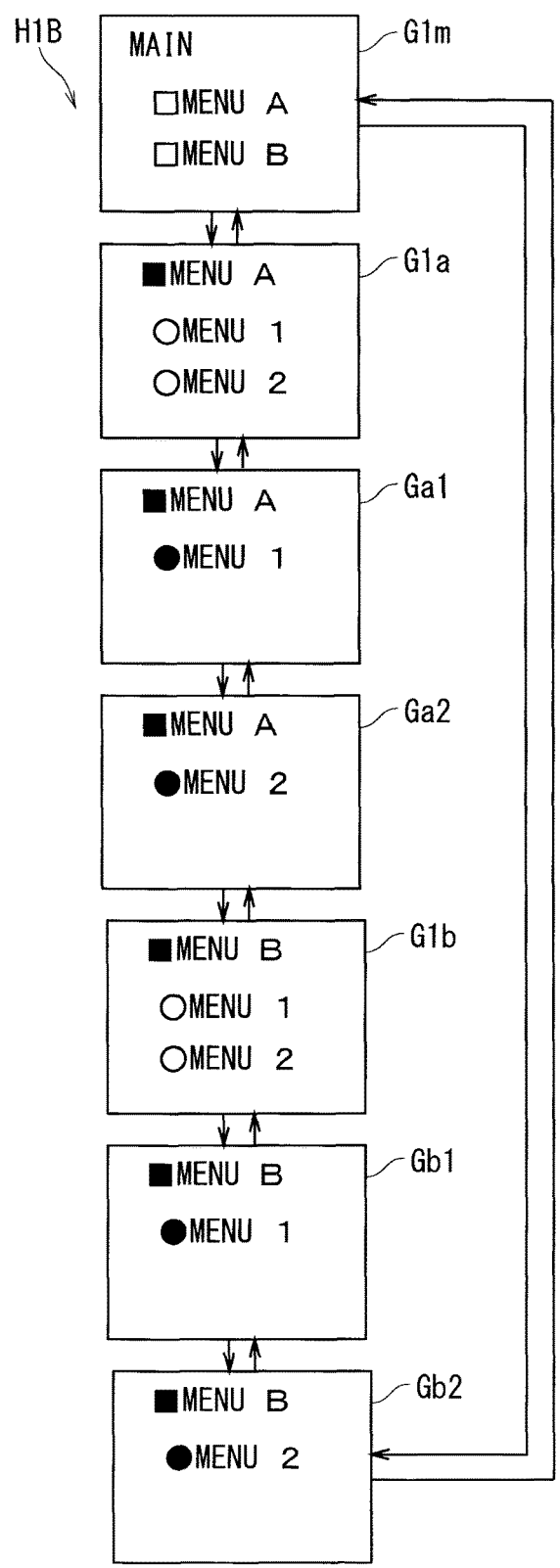
FIG. 10 shows an example of how a display screen transitions in accordance with an all-screens sequential transition rule.

FIGS. 8 to 10 show examples of how display screens transition in accordance with the respective screen transition rules. FIG. 8 shows an example of how a display screen transitions in accordance with the normal screen transition rule defined in the first rule table TL11 shown in FIG. 5. FIG. 9 shows an example of how a display screen transitions in accordance with the simple screen transition rule defined in the second rule table TL12 shown in FIG. 6. FIG. 10 shows an example of how a display screen transitions in accordance with the all-screens sequential transition rule defined in the third rule table TL13 shown in FIG. 7. FIGS. 8 to 10 show that a transition can be performed from a screen positioned at a start point of an arrow to a screen positioned at an end point of the arrow.

<(1-2-1) Normal Screen Transition Rule>

As shown in FIG. 8, the normal screen transition rule defined in the first rule table TL11 is a rule that dendritically associates a plurality of screens and causes, by the display controller 112, a display screen of the display unit 13 to transition between the screens associated between hierarchies.

For example, the normal screen transition rule defines the main screen G1m based on the main screen data as a screen that serves as a start point of a top first hierarchy H1. That is to say, the main screen G1m belongs to the first hierarchy H1. A plurality of screens based on a plurality of items provided as the options presented on the main screen G1m belong to the second hierarchy H2 as the hierarchy immediately below the first hierarchy H1. In the present embodiment, the plurality of screens belonging to the second hierarchy H2 are the menu A screen G1a and the menu B screen G1b. A plurality of screens based on a plurality of items provided as options presented on the respective screens belonging to the second hierarchy H2 belong to the third hierarchy H3 as a hierarchy immediately below the second hierarchy H2. In the present embodiment, the plurality of screens belonging to the third hierarchy H3 include the menu A1 screen Ga1 and the menu A2 screen Ga2 provided as options of the menu A screen G1a of the second hierarchy H2. The plurality of screens belonging to the third hierarchy H3 further include the menu B1 screen Gb1 and the menu B2 screen Gb2 for the options of the menu B screen G1b of the second hierarchy H2.

The normal screen transition rule defines that one screen based on the screen data of one hierarchy of the first to third hierarchies H1 to H3 is displayed in the display unit 13. The normal screen transition rule includes a rule that causes, with one screen of one hierarchy displayed in the display unit 13, a display screen of the display unit 13 to transition from the one screen to another screen based on the screen data of another hierarchy immediately below the one hierarchy by the display controller 112 in response to a signal input in accordance with an action of the user. That is to say, the normal screen transition rule defines screen transitions between the first to third hierarchies H1 to H3 and includes a rule that causes a screen of a relatively high hierarchy to transition to a screen of a relatively low hierarchy corresponding to an option selected in the screen of the relatively high hierarchy.

In other words, the normal screen transition rule includes a rule that causes, with a first screen displayed on the display unit 13, a display screen of the display unit 13 to transition from the first screen to a second screen by the display controller 112 in response to a signal input in accordance with a first action by the user. Herein, the first action may be, for example, an action of selecting an option regarding the second screen in the first screen. The first screen may be a screen based on the first screen data and the second screen may be a screen based on the second screen data.

The normal screen transition rule includes a rule that causes, with the first screen displayed in the display unit 13, a display screen of the display unit 13 to transition from the first screen to a third screen by the display controller 112 in response to a signal input in accordance with a second action by the user. Herein, the second action may be an action different from the first action and may be an action of selecting an option for the third screen in the first screen. The third screen may be a screen based on the third screen data.

The normal screen transition rule includes a rule that causes, with one screen of one hierarchy displayed in the display unit 13, a display screen to transition from the one screen to another screen based on screen data of another hierarchy immediately above the one hierarchy by the display controller 112 in response to a signal input in accordance with an action of the user. That is to say, the normal screen transition rule defines screen transition between the first to third hierarchies H1 to H3 and includes a rule that causes a screen of a relatively low hierarchy to transition to a screen of a relatively high hierarchy. The action of the user in this case may be an action of causing a return to a screen of a higher hierarchy set in advance, which may be, for example, an action of pressing the LEFT button 1253.

Specifically, as shown in FIGS. 5 and 8, the normal screen transition rule includes rules defining screen transitions described in [1A] to [1L] below.

[1A] With the main screen G1m displayed in the display unit 13, a display screen is caused to transition from the main screen G1m to the menu A screen G1a in accordance with an action of selecting the menu A by the user. The action of selecting the menu A may be, for example, an action of pressing the UP button 1251 and the DOWN button 1252 to move a thick frame FL0 up and down on the main screen G1m and pressing the OK button 126 with the menu A surrounded by the thick frame FL0.

[1B] With the menu A screen G1a displayed in the display unit 13, a display screen is caused to transition from the menu A screen G1a to the main screen G1m in accordance with an action of causing a return to a screen of a higher hierarchy by the user. The action of causing a return to a screen of a higher hierarchy may be, for example, an action of pressing the LEFT button 1253 with the menu A screen G1a displayed.

[1C] With the menu A screen G1a displayed in the display unit 13, a display screen is caused to transition from the menu A screen G1a to the menu A1 screen Ga1 in accordance with an action of selecting a menu 1 by the user. The action of selecting the menu 1 may be, for example, an action of pressing the UP button 1251 and the DOWN button 1252 to move the thick frame FL0 up and down on the menu A screen G1a and pressing the OK button 126 with the menu 1 surrounded by the thick frame FL0.

[1D] With the menu A1 screen Ga1 displayed in the display unit 13, a display screen is caused to transition from the menu A1 screen Ga1 to the menu A screen G1a in accordance with an action of causing a return to a screen of a higher hierarchy by the user as in [1B] above.

[1E] With the menu A screen G1a displayed in the display unit 13, a display screen is caused to transition from the menu A screen G1a to the menu A2 screen Ga2 in accordance with an action of selecting a menu 2 by the user. The action of selecting the menu 2 may be, for example, an action of pressing the UP button 1251 and the DOWN button 1252 to move the thick frame FL0 up and down on the menu A screen G1a and pressing the OK button 126 with the menu 2 surrounded by the thick frame FL0.

[1F] With the menu A2 screen Ga2 displayed in the display unit 13, a display screen is caused to transition from the menu A2 screen Ga2 to the menu A screen G1a in accordance with an action of causing a return to a screen of a higher hierarchy by the user as in [1B] above.

[1G] With the main screen G1m displayed in the display unit 13, a display screen is caused to transition from the main screen G1m to the menu B screen G1b in accordance with an action of selecting the menu B by the user. The action of selecting the menu B may be, for example, an action of pressing the UP button 1251 and the DOWN button 1252 to move the thick frame FL0 up and down on the main screen G1m and pressing the OK button 126 with the menu B surrounded by the thick frame FL0.

[1H] With the menu B screen G1b displayed in the display unit 13, a display screen is caused to transition from the menu B screen G1b to the main screen G1m in accordance with an action of causing a return to a screen of a higher hierarchy by the user as in [1B] above.

[1I] With the menu B screen G1b displayed in the display unit 13, a display screen is caused to transition from the menu B screen G1b to the menu B1 screen Gb1 in accordance with an action of selecting the menu 1 by the user. The action of selecting the menu 1 may be, for example, an action of pressing the UP button 1251 and the DOWN button 1252 to move the thick frame FL0 up and down on the menu B screen G1b and pressing the OK button 126 with the menu 1 surrounded by the thick frame FL0.

[1J] With the menu B1 screen Gb1 displayed in the display unit 13, a display screen is caused to transition from the menu B1 screen Gb1 to the menu B screen G1b in accordance with an action of causing a return to a screen of a higher hierarchy by the user as in [1B] above.

[1K] With the menu B screen G1b displayed in the display unit 13, a display screen is caused to transition from the menu B screen G1b to the menu B2 screen Gb2 in accordance with an action of selecting the menu 2 by the user. The action of selecting the menu 2 may be, for example, an action of pressing the UP button 1251 and the DOWN button 1252 to move the thick frame FL0 up and down on the menu B screen G1b and pressing the OK button 126 with the menu 2 surrounded by the thick frame FL0.

[1L] With the menu B2 screen Gb2 displayed in the display unit 13, a display screen is caused to transition from the menu B2 screen Gb2 to the menu B screen G1b in accordance with an action of causing a return to a screen of a higher hierarchy by the user as in [1B] above.

<(1-2-2) Simple Screen Transition Rule>

As shown in FIG. 9, the simple screen transition rule defined in the second rule table TL12 is a screen transition rule in which the number of hierarchies defined in the normal screen transition rule is reduced. The simple screen transition rule defines a second hierarchy H2A in which the screen of the lowest third hierarchy H3 in the normal screen transition rule is incorporated into the second hierarchy H2. That is to say, in the simple screen transition rule, the first to third hierarchies H1 to H3 defined in the normal screen transition rule are changed to first and second hierarchies H1A and H2A. Additionally, the simple screen transition rule defines a screen transition between hierarchies and a screen transition in the second hierarchy H2A.

For example, the simple screen transition rule defines the main screen G1m based on the main screen data as one screen that serves as a start point of a top first hierarchy H1. That is to say, the main screen G1m belongs to the first hierarchy H1. A plurality of screens corresponding to a plurality of items provided as options presented on the main screen G1m and a plurality of screens corresponding to a plurality of items presented on the respective screens of the plurality of screens belong to the second hierarchy H2A as a hierarchy immediately below the first hierarchy H1. In the present embodiment, the plurality of screens belonging to the second hierarchy H2A include the menu A screen G1a and the menu B screen G1b. The plurality of screens belonging to the second hierarchy H2A include the menu A1 screen Ga1 and the menu A2 screen Ga2 corresponding to a plurality of items presented on the menu A screen G1a. The plurality of screens belonging to the second hierarchy H2A further include the menu B1 screen Gb1 and the menu B2 screen Gb2 corresponding to a plurality of items presented on the menu B screen G1b.

The simple screen transition rule defines that one screen based on the screen data of one hierarchy of the first and second hierarchies H1 and H2A is displayed in the display unit 13. The simple screen transition rule includes a rule that causes, with the main screen G1m displayed in the display unit 13, a display screen of the display unit 13 to transition from the main screen G1m to the first screen by the display controller 112 in response to a signal input in accordance with an action of the user. Herein, the action of the user may be, for example, an action of selecting an option corresponding to the first screen on the main screen G1m. The first screen may be the menu A screen G1a and the menu B screen G1b belonging to the second hierarchy H2A as a lower hierarchy. That is to say, the simple screen transition rule includes a rule that causes a screen of a relatively high hierarchy to transition to a screen of a relatively low hierarchy corresponding to the option selected on the screen of the relatively high hierarchy.

The simple screen transition rule includes a rule that causes, with the first screen displayed in the display unit 13, a display screen of the display unit 13 to transition from the first screen to the second screen by the display controller 112 in response to a signal input in accordance with the third action by the user. Herein, the third action may be a predetermined action set in advance. The predetermined action may be, for example, an action of pressing the DOWN button 1252. The first screen is a screen based on the first screen data and may be any of the menu A screen G1a and the menu B screen G1b. The second screen is a screen based on the second screen data. For example, the second screen may be the menu A1 screen Ga1 when the first screen is the menu A screen G1a, or the second screen may be the menu B1 screen Gb1 when the first screen is the menu B screen G1b.

The simple screen transition rule includes a rule that causes, with the second screen displayed in the display unit 13, a display screen of the display unit 13 to transition from the second screen to the third screen by the display controller 112 in response to a signal input in accordance with a predetermined third action by the user. Herein, the third action may be the predetermined action set in advance. The third screen is a screen based on the third screen data. For example, the third screen may be the menu A2 screen Ga2 when the second screen is the menu A1 screen Ga1, or the third screen may be the menu B2 screen Gb2 when the second screen is the menu B1 screen Gb1.

That is to say, according to the simple screen transition rule as the second screen transition rule, a plurality of screens belonging to the intermediate second hierarchy H2 and the lowest third hierarchy H3 in the normal screen transition rule as the first screen transition rule are displayed sequentially in the same second hierarchy H2A.

The simple screen transition rule includes a rule that causes, with the second screen displayed in the display unit 13, a display screen of the display unit 13 to transition from the second screen to the first screen by the display controller 112 in response to a signal input in accordance with a specific action by the user. Herein, the specific action may be a predetermined action set in advance and may be, for example, an action of pressing the UP button 1251. Additionally, the simple screen transition rule includes a rule that causes, with the third screen displayed in the display unit 13, a display screen of the display unit 13 to transition from the third screen to the second screen by the display controller 112 in response to a signal input in accordance with a specific action by the user.

The simple screen transition rule includes a rule that causes, with the screen based on the screen data of the second hierarchy H2A displayed in the display unit 13, a display screen of the display unit 13 to transition to the main screen G1*m* by the display controller 112 in response to a signal input in accordance with an action of the user. That is to say, the simple screen transition rule includes a rule that causes a screen of a relatively low hierarchy to transition to a screen of a relatively high hierarchy. The action of the user in this case may be a preset action and may be, for example, an action of pressing the LEFT button 1253.

Specifically, as shown in FIGS. 6 and 9, the simple screen transition rule includes a rule that defines screen transitions described in [2A] to [2O] below.

[2A] With the main screen G1*m* displayed in the display unit 13, a display screen is caused to transition from the main screen G1*m* to the menu A screen G1*a* in accordance with an action of selecting the menu A by the user as in [1A] above.

[2B] With the menu A screen G1*a* displayed in the display unit 13, a display screen is caused to transition from the menu A screen G1*a* to the menu A1 screen Ga1 in accordance with an action of selecting the next screen display. The action of selecting the next screen display may be a predetermined action set in advance as the third action and may be, for example, an action of pressing the DOWN button 1252.

[2C] With the menu A screen G1*a* displayed in the display unit 13, a display screen is caused to transition from the menu A screen G1*a* to the menu A2 screen Ga2 in accordance with an action of selecting the previous screen display. The action of selecting the previous screen display may be a predetermined action set in advance and may be, for example, an action of pressing the UP button 1251.

[2D] With the menu A1 screen Ga1 displayed in the display unit 13, a display screen is caused to transition from the menu A1 screen Ga1 to the menu A2 screen Ga2 in accordance with an action of selecting the next screen display as in [2B] above.

[2E] With the menu A1 screen Ga1 displayed in the display unit 13, a display screen is caused to transition from the menu A1 screen Ga1 to the menu A screen G1*a* in accordance with an action of selecting the previous screen display as in [2C] above.

[2F] With the menu A2 screen Ga2 displayed in the display unit 13, a display screen is caused to transition from the menu A2 screen Ga2 to the menu A screen G1*a* in accordance with an action of selecting the next screen display as in [2B] above.

[2G] With the menu A2 screen Ga2 displayed in the display unit 13, a display screen is caused to transition from the menu A2 screen Ga2 to the menu A1 screen Ga1 in accordance with an action of selecting the previous screen display as in [2C] above.

[2H] With the main screen G1*m* displayed in the display unit 13, a display screen is caused to transition from the main screen G1*m* to the menu B screen G1*b* in accordance with an action of selecting the menu B by the user as in [1G] above.

[2I] With the menu B screen G1*b* displayed in the display unit 13, a display screen is caused to transition from the menu B screen G1*b* to the menu B1 screen Gb1 in accordance with an action of selecting the next screen display as in [2B] above.

[2J] With the menu B screen G1*b* displayed in the display unit 13, a display screen is caused to transition from the menu B screen G1*b* to the menu B2 screen Ga2 in accordance with an action of selecting the previous screen display as in [2C] above.

[2K] With the menu B1 screen Gb1 displayed in the display unit 13, a display screen is caused to transition from the menu B1 screen Gb1 to the menu B2 screen Gb2 in accordance with an action of selecting the next screen display as in [2B] above.

[2L] With the menu B1 screen Gb1 displayed in the display unit 13, a display screen is caused to transition from the menu B1 screen Gb1 to the menu B screen G1*b* in accordance with an action of selecting the previous screen display as in [2C] above.

[2M] With the menu B2 screen Gb2 displayed in the display unit 13, a display screen is caused to transition from the menu B2 screen Gb2 to the menu B screen G1*b* in accordance with an action of selecting the next screen display as in [2B] above.

[2N] With the menu B2 screen Gb2 displayed in the display unit 13, a display screen is caused to transition from the menu B2 screen Gb2 to the menu B1 screen Gb1 in accordance with an action of selecting the previous screen display as in [2C] above.

[2O] With any one screen of the menu A screen G1*a*, the menu A1 screen Ga1, the menu A2 screen Ga2, the menu B screen G1*b*, the menu B1 screen Gb1, and the menu B2 screen Gb2 displayed in the display unit 13, a display screen is caused to transition to the main screen G1*m* in accordance with an action of causing a return to a screen of a higher hierarchy by the user as in [1B] above.

The display screen transition according to the above-mentioned simple screen transition rule simplifies a hierarchical structure for display screen transition. Thus, a desired item can be found easily and rapidly in a small display unit 13 with a limited amount of information that can be displayed at one time.

<(1-2-3) All-Screens Sequential Transition Rule>

As shown in FIG. 10, the all-screens sequential transition rule defined in the third rule table TL13 is a screen transition rule in which a dendritic hierarchical structure showing the screen association defined in the normal screen transition rule is broken down. In other words, the all-screens sequential transition rule defines a single one hierarchy H1B in which the screen of the middle second hierarchy H2 and the screen of the lowest third hierarchy H3 in the normal screen transition rule are incorporated into the top first hierarchy H1. That is to say, in the all-screens sequential transition rule, the first to third hierarchies H1 to H3 defined in the normal screen transition rule and the first and second hierarchies H1 and H2A defined in the simple screen transition rule are changed to a single one hierarchy H1B. The all-screens sequential transition rule defines that one screen based on the screen data of the single one hierarchy H1B is displayed in the display unit 13. The all-screens sequential transition rule also defines screen transitions in which all the screens in one hierarchy H1B are displayed sequentially.

For example, the all-screens sequential transition rule includes a rule that causes a display screen of the display unit 13 to transition by the display controller 112 in response to a signal input in accordance with the third action by the user such that all screensbased on all pieces of screen data are displayed. Herein, for example, when all the screens are associated with the first order, a display screen transitions in accordance with the first order every time the user performs the third action. Thus, a display screen transitions such that all the screens are displayed sequentially. The third action may be a predetermined action set in advance. The predetermined action may be, for example, an action of pressing the DOWN button 1252. That is to say, according to the all-screens sequential transition rule as the second screen transition rule, a plurality of screens belonging to all the hierarchies H1 to H3 in the normal screen transition rule as a first screen transition rule can be displayed in the first order in a single one hierarchy H1B. From another perspective, according to the all-screens sequential transition rule, a plurality of screens belonging to all the hierarchies H1 and H2A in the simple screen transition rule can be displayed in the first order in a single one hierarchy H1B.

The all-screens sequential transition rule includes a rule that causes a display screen of the display unit 13 to transition from the first screen to the second screen by the display controller 112 in response to a signal input in accordance with the third action by the user, as in the simple screen transition rule. The first screen is a screenbased on the first screen data and may be any one of the menu A screen G1*a* and the menu B screen G1*b*. The second screen is a screen based on the second screen data. For example, the second screen may be the menu A1 screen Ga1 when the first screen is the menu A screen G1*a*, or the second screen may be the menu B1 screen Gb1 when the first screen is the menu B screen G1*b*.

Further, the all-screens sequential transition rule includes a rule that causes a display screen of the display unit 13 to transition from the second screen to the third screen by the display controller 112 in response to a signal input in accordance with the third action by the user, as in the simple screen transition rule. The third screen is a screen based on the third screen data. For example, the third screen may be the menu A2 screen Ga2 when the second screen is the menu A1 screen Ga1, or the third screen may be the menu B2 screen Gb2 when the second screen is the menu B1 screen Gb1.

For example, when all the screens are associated with the second order reverse to the first order, a display screen transitions in accordance with the second order every time the user performs a specific action, and accordingly, a display screen transitions such that all the screens are displayed sequentially. The specific action may be a predetermined action set in advance. The specific action may be, for example, an action of pressing the UP button 1251. That is to say, according to the all-screens sequential transition rule as the second screen transition rule, a plurality of screens belonging to all the hierarchies H1 to H3 in the normal screen transition rule as the first screen transition rule can be displayed in the second order in a single one hierarchy H1B. From another perspective, according to the all-screens sequential transition rule, a plurality of screens belonging to all the hierarchies H1 and H2A in the simple screen transition rule can be displayed in the second order in a single one hierarchy H1B.

Specifically, as shown in FIGS. 7 and 10, the all-screens sequential transition rule includes a rule that defines screen transitions described in [3A] to [3N] below.

[3A] With the main screen G1*m* displayed in the display unit 13, a display screen is caused to transition from the main screen G1*m* to the menu A screen G1*a* in accordance with an action of selecting the next screen display. The action of selecting the next screen display may be a predetermined action set in advance as a third action and may be, for example, an action of pressing the DOWN button 1252.

[3B] With the menu A screen G1*a* displayed in the display unit 13, a display screen is caused to transition from the menu A screen G1*a* to the menu A1 screen Ga1 in accordance with an action of selecting the next screen display as in [3A] above.

[3C] With the menu A1 screen Ga1 displayed in the display unit 13, a display screen is caused to transition from the menu A1 screen Ga1 to the menu A2 screen Ga2 in accordance with an action of selecting the next screen display as in [3A] above.

[3D] With the menu A2 screen Ga2 displayed in the display unit 13, a display screen is caused to transition from the menu A2 screen Ga2 to the menu B screen G1*b* in accordance with an action of selecting the next screen display as in [3A] above.

[3E] With the menu B screen G1*b* displayed in the display unit 13, a display screen is caused to transition from the menu B screen G1*b* to the menu B1 screen Gb1 in accordance with an action of selecting the next screen display as in [3A] above.

[3F] With the menu B1 screen Gb1 displayed in the display unit 13, a display screen is caused to transition from the menu B1 screen Gb1 to the menu B2 screen Gb2 in accordance with an action of selecting the next screen display as in [3A] above.

[3G] With the menu B2 screen Gb2 displayed in the display unit 13, a display screen is caused to transition from the menu B2 screen Gb2 to the main screen G1*m* in accordance with an action of selecting the next screen display as in [3A] above.

[3H] With the menu B2 screen Gb2 displayed in the display unit 13, a display screen is caused to transition from the menu B2 screen Gb2 to the menu B1 screen Gb1 in accordance with an action of selecting the previous screen display. The action of selecting the previous screen display may be a predetermined action set in advance and may be, for example, an action of pressing the UP button 1251.

[3I] With the menu B1 screen Gb1 displayed in the display unit 13, a display screen is caused to transition from the menu B1 screen Gb1 to the menu B screen G1*b* in accordance with an action of selecting the previous screen display as in [3H] above.

[3J] With the menu B screen G1*b* displayed in the display unit 13, a display screen is caused to transition from the menu B screen G1*b* to the menu A2 screen Ga2 in accordance with an action of selecting the previous screen display as in [3H] above.

[3K] With the menu A2 screen Ga2 displayed in the display unit 13, a display screen is caused to transition from the menu A2 screen Ga2 to the menu A1 screen Ga1 in accordance with an action of selecting the previous screen display as in [3H] above.

[3L] With the menu A1 screen Ga1 displayed in the display unit 13, a display screen is caused to transition from the menu A1 screen Ga1 to the menu A screen G1*a* in accordance with an action of selecting the previous screen display as in [3H] above.

[3M] With the menu A screen G1*a* displayed in the display unit 13, a display screen is caused to transition from the menu A screen G1*a* to the main screen G1*m* in accordance with an action of selecting the previous screen display as in [3H] above.

[3N] With the main screen G1*m* displayed in the display unit 13, a display screen is caused to transition from the main screen G1m to the menu B2 screen Gb2 in accordance with an action of selecting the previous screen display as in [3H] above.

In the display screen transition according to the above-mentioned all-screens sequential transition rule, the whole hierarchical structure for display screen transition is eliminated, and all the screens can be displayed sequentially by repeating a simple action. Thus, a desired item can be found easily and rapidly in a small display unit 13 with a limited amount of information that can be displayed at one time.

<(1-3) Specific Examples of Display Screens>

FIGS. 11 to 15 show specific examples of display screens displayed in the display unit 13. Description will now be given of an example in which a display screen transitions in accordance with the normal screen transition rule.

Figure 11:
FIG. 11 shows an example of a main screen.

FIG. 11 shows an example of the main screen G1m. In the main screen G1m shown in FIG. 11, icons for options of eight items are arranged. The main screen G1m is set by the operation performed on the cross button 125 by the user such that one desired icon of the eight icons is surrounded by a thick frame FL1. In this case, the user presses the OK button 126, so that an option for the icon surrounded by the thick frame FL1 is selected. For example, when an item for color settings is selected, a menu screen G1c (FIG. 12) that lists the setting contents of the five items for the color settings is displayed in the display unit 13.

Figure 12:
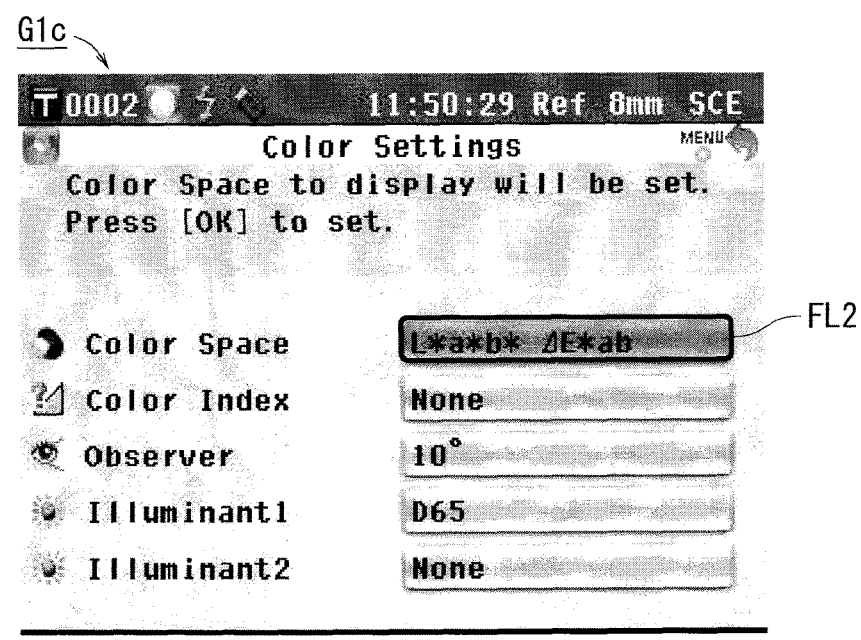
FIG. 12 shows an example of a menu screen for color settings.

The menu screen G1c shown in FIG. 12 is set by the user pressing the cross button 125 such that an area showing the setting contents of desired one of the five items is surrounded by a thick frame FL2. In this case, the user presses the OK button 126, so that the setting of the item for the setting contents, surrounded by the thick frame FL2, is selected. For example, when the item for color space settings is selected, a menu screen Gc1 (FIG. 13) that lists 12 types of color spaces for the color space settings as options is displayed in the display unit 13.

Figure 13:
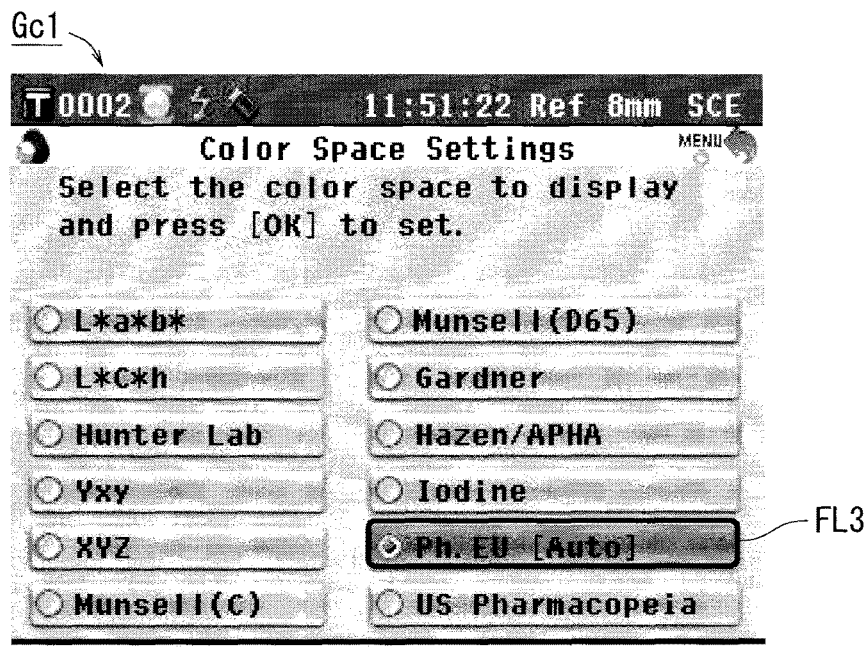
FIG. 13 shows an example of a menu screen for color space settings.

The menu screen Gc1 shown in FIG. 13 is set by the user pressing the cross button 125 such that an area showing one desired color space of the 12 types of color spaces is surrounded by a thick frame FL3. In this case, the user presses the OK button 126, so that the color space setting, surrounded by the thick frame FL3, is selected. For example, when an item for Ph. EU hue setting as one color space of the 12 types of color spaces is selected, a menu screen Gc111 (FIG. 14) that lists options of six items for Ph. EU hue setting is displayed in the display unit 13.

Figure 14:
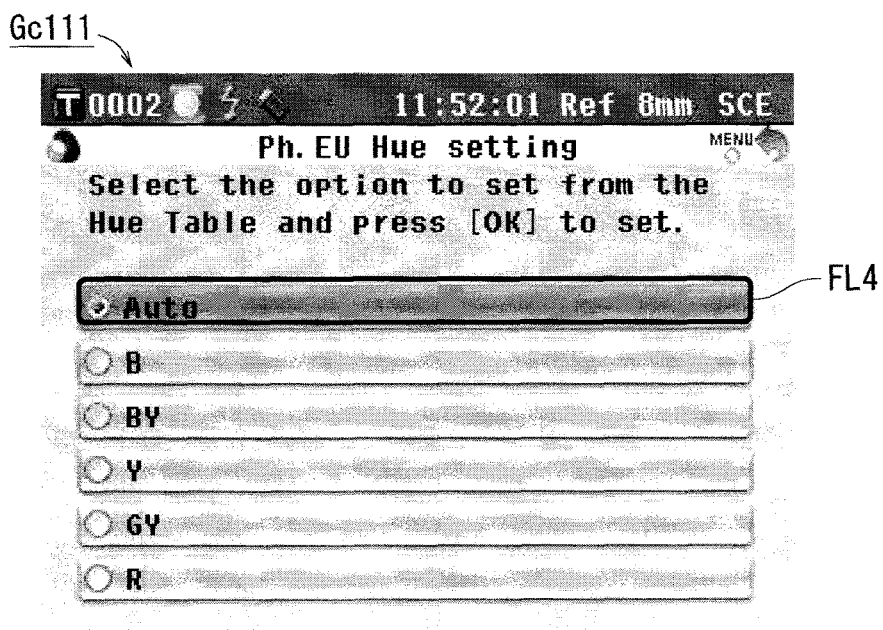
FIG. 14 shows an example of a menu screen for Ph. EU hue setting.

The menu screen Gc111 shown in FIG. 14 is set by the user pressing the cross button 125 such that an area showing one desired option of the options of the six items is surrounded by a thick frame FL4. In this case, the user presses the OK button 126, so that the option of the item surrounded by the thick frame FL4 is selected. For example, when Auto as one option of the six options is selected, automatic setting is performed for the hue used in Ph. EU computation.

<(1-4) Summary of One Embodiment>

As described above, the colorimeter 1 serving as a display device according to one embodiment selectively designates one screen transition rule of a plurality of screen transition rules, so that the hierarchical structure for display screen transition can be simplified or eliminated. Thus, a user with a deep understanding of the functions of the colorimeter 1 can freely perform a display screen transition of the colorimeter 1 by designating a normal screen transition rule that defines a hierarchical structure for display screen transition. In contrast, a user with a limited understanding of the functions of the colorimeter 1 can display more screens sequentially through a simple action by simplifying or eliminating a hierarchical structure for display screen transition, and accordingly, can easily cause a display screen to transition to a desired screen.

In particular, for example, even a user who knows nothing about a display screen transition of the colorimeter 1 can sequentially check all the screens by eliminating a hierarchical structure for display screen transition. For example, a screen showing a menu that is set less frequently belongs to a lower hierarchy in many cases. Thus, the user cannot easily cause a display screen to transition to such a screen. The user, however, can simplify or eliminate a hierarchical structure for display screen transition and display more screens sequentially through a simple action, thereby easily causing a display screen to transition to a screen that cannot be normally displayed through display screen transition with ease.

Irrespective of the depth of user's understanding about the functions of the colorimeter 1, therefore, the user can easily cause a display screen to transition to a desired screen. Thus, a desired item can be found easily and rapidly in a small display unit 13 with a limited amount of information that can be displayed at one time.

In the design and development stage of the colorimeter 1, for example, a screen designer wants to check various screens displayed in the display unit 13 in some cases. In such cases, for example, if all the screens can be checked sequentially, all the screens can be checked thoroughly for the design including color arrangement in the screens. This can solve a problem, such as the difficulty in discerning characters, figures, and the like. For example, problems pertaining to issues in universal design, such as the problem whether a screen is easy to view for a wide range of people including colorblind people, can be solved. Also, for example, the number of digits of numeric values indicating various measurement values and various setting values and the size of characters can be set to ones visible to more people. Also, whether display elements, such as menu items and icons indicating battery charging status, can be intuitively recognizable and whether the display elements are excellent in the designability or not are checked thoroughly, so that the display elements can improve. Moreover, even a person who does not know about the colorimeter 1 can capture images of all the screens in creating, for example, the operating instructions of the colorimeter 1.

(2) Modifications

The present invention is not limited to the embodiment above, and numerous modifications and variations can be devised without departing from the scope of the invention.

<(2-1) First Modification>

In the colorimeter 1 according to the embodiment, the language describing the character information on characters displayed may be switchable.

In this case, for example, a plurality of pieces of screen data SD1 may include screen data on screens described in different languages for the same contents. For example, a storage 11s stores main screen data on a main screen described in a first language and main screen data on a main screen described in a second language. Also, for example, the storage 11s stores menu A screen data as first screen data on a menu A screen as a first screen described in the first language and menu A screen data as fourth screen data on a menu A screen as a fourth screen described in the second language. Also, for example, the storage 11s stores menu A1 screen data as second screen data on a menu A1 screen as a second screen described in the first language and menu A1 screen data as fifth screen data on a menu A1 screen as a fifth screen described in the second language. Also, for example, the storage 11s stores menu A2 screen data as third screen data on a menu A2 screen as a third screen described in the first language and menu A2 screen data as sixth screen data on a menu A2 screen as a sixth screen described in the second language. The first language may be, for example, Japanese, and the second language may be, for example, English.

As shown in FIG. 15, for example, first to third rule tables TL11 to TL13 may be replaced with first to third rule tables TL11a to TL11d, TL12a to TL12d, and TL13a to TL13d. Herein, for example, the first to third rule tables TL11a to TL13a are rule tables in Japanese, and the first to third rule tables TL11b to TL13b are rule tables in English. Also, for example, the first to third rule tables TL11c to TL13c are rule tables in Chinese, and the first to third rule tables TL11d to TL13d are rule tables in German. In response to a signal input in accordance with an operation performed on the operation unit 12 by the user, the designation unit 111 may selectively designate, for example, one rule table of the first to third rule tables TL11a to TL11d, TL12a to TL12d, and TL13a to TL13d.

An example action of switching languages for display screens will now be described.

In one example, when, for example, an item for system setting is selected on the main screen G1m shown in FIG. 11, a menu screen G1h (FIG. 16) that lists the setting contents of five items for system setting are displayed in the display unit 13.

Figure 16:
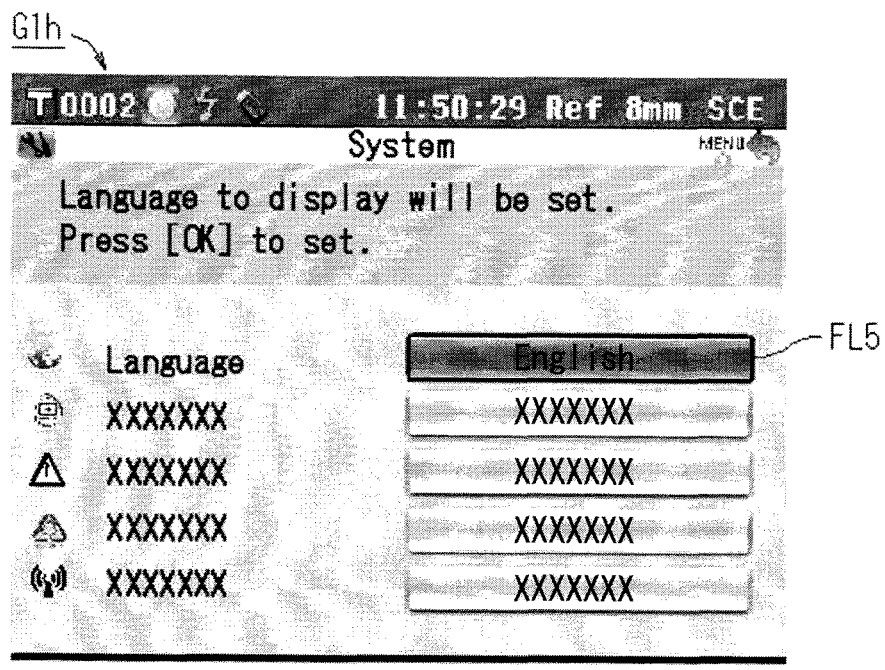
FIG. 16 shows an example of a menu screen for system settings.

The menu screen G1h shown in FIG. 16 is set by the user pressing the cross button 125 such that an area showing the setting contents of desired one of the five items is surrounded by a thick frame FL5. In this case, the user presses the OK button 126, so that the setting of the item for the setting contents surrounded by the thick frame FL5 is selected. For example, when the item for language setting is selected, a setting screen G1i (FIG. 17) that lists four languages for language setting as options is displayed in the display unit 13.

Figure 17:
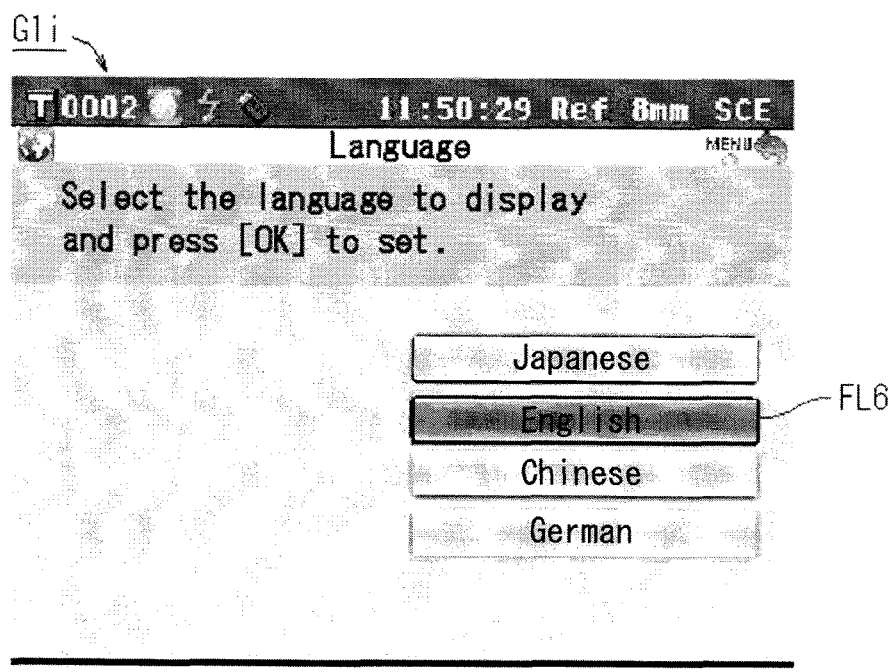
FIG. 17 shows an example of a screen for language setting.

The setting screen G1i shown in FIG. 17 is set by the user pressing the cross button 125 such that an area showing one desired language of the four languages is surrounded by a thick frame FL6. In this case, the user presses the OK button 126, so that the one language surrounded by the thick frame FL6 is selected. A rule table to be selectively designated by the designation unit 111 is changed in accordance with the selected language. For example, when the language is changed from Japanese to English with the designation unit 111 designating the third rule table TL13a, the designation unit 111 designates the third rule table TL13b.

Figure 18:
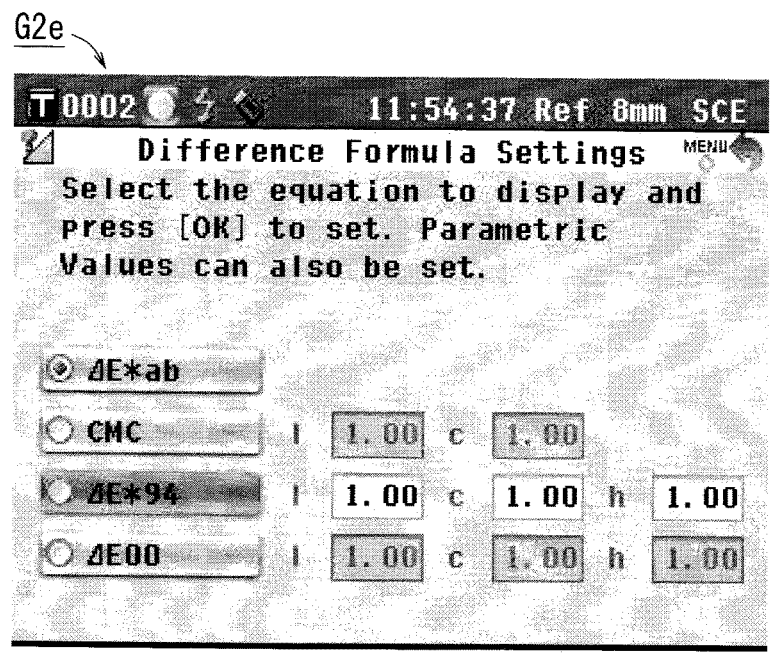
FIG. 18 shows an example of a screen described in English.
Figure 19:
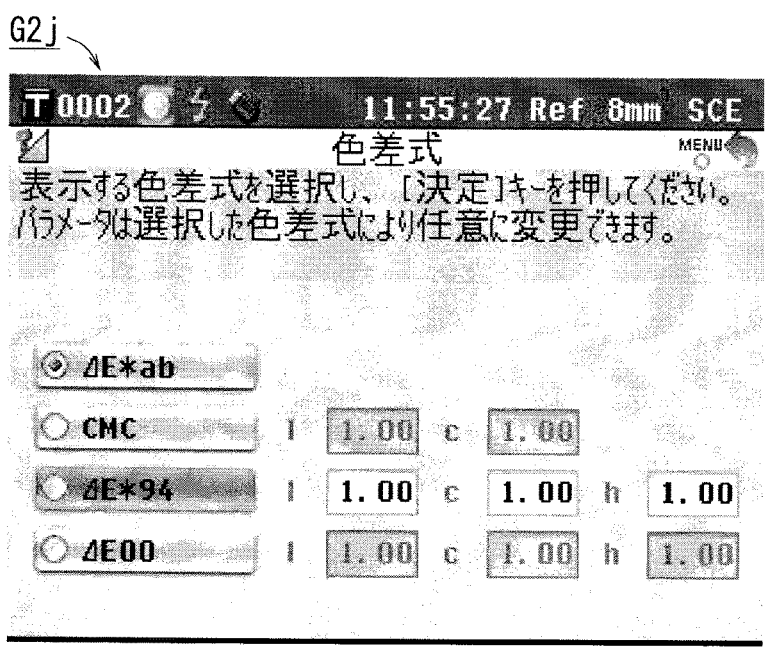
FIG. 19 shows an example of a screen described in Japanese.
Figure 20:
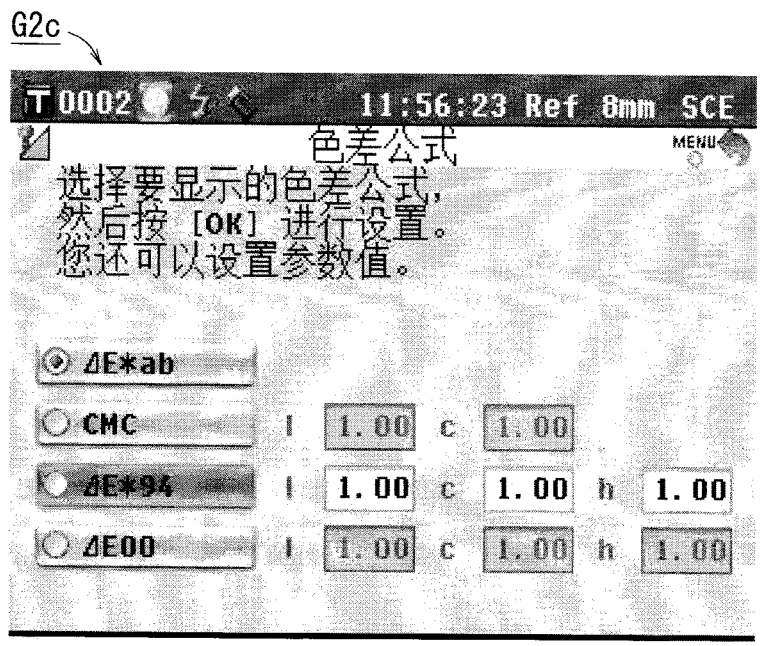
FIG. 20 shows an example of a screen described in Chinese.
Figure 21:
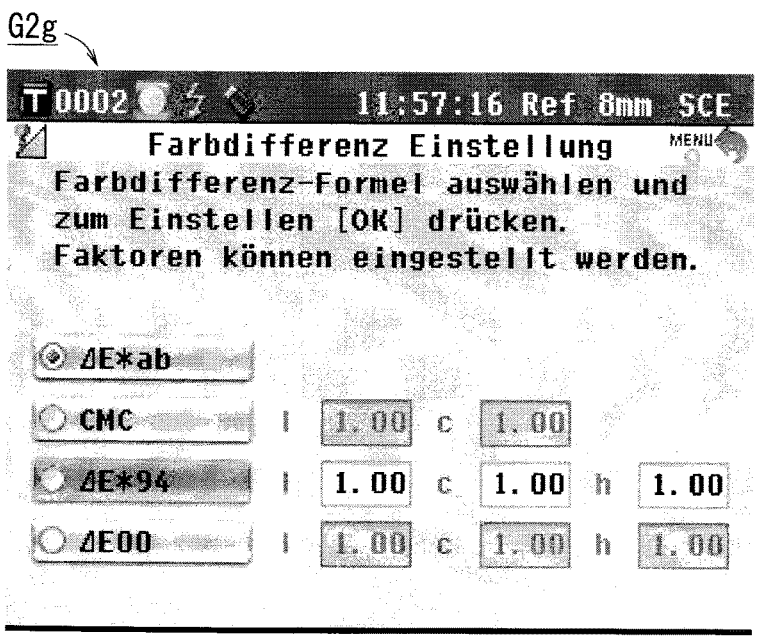
FIG. 21 shows an example of a screen described in German.

FIGS. 18 to 21 show examples of screens showing the same contents described in different languages. FIG. 18 shows a screen G2e described in English, FIG. 19 shows a screen G2j described in Japanese, FIG. 20 shows a screen G2c described in Chinese, and FIG. 21 shows a screen G2g described in German.

In the configuration above, if the designation unit 111 designates any rule table of the first rule tables TL11a to TL11d, display screen transitions are executed as in the normal screen transition rule shown in FIGS. 5 and 8.

For example, the normal screen transition rule defined in the first rule table TL11a includes a rule that causes, with the first screen displayed in the display unit 13, a display screen of the display unit 13 to transition from the first screen to the second screen by the display controller 112 in response to a signal input in accordance with a first action by the user.

Herein, the first action may be, for example, an action of selecting an option for the second screen in the first screen. The normal screen transition rule defined in the first rule table TL11a includes a rule that causes, with the first screen displayed in the display unit 13, a display screen of the display unit 13 to transition from the first screen to the third screen by the display controller 112 in response to a signal input in accordance with a second action by the user. Herein, the second action may be, for example, an action of selecting an option for the third screen in the first screen. The first screen may be, for example, the menu A screen described in Japanese or the menu B screen described in Japanese. For example, when the first screen is the menu A screen described in Japanese, the second screen may be the menu A1 screen described in Japanese. For example, when the first screen is the menu B screen described in Japanese, the second screen may be the menu B1 screen described in Japanese. Further, for example, when the first screen is the menu A screen described in Japanese, the third screen may be the menu A2 screen described in Japanese. When the first screen is the menu B screen described in Japanese, the third screen may be the menu B2 screen described in Japanese.

For example, the normal screen transition rule defined in the first rule table TL11b includes a rule that causes, with the fourth screen displayed in the display unit 13, a display screen of the display unit 13 to transition from the fourth screen to the fifth screen by the display controller 112 in response to a signal input in accordance with a fourth action by the user. Herein, the fourth action may be, for example, an action of selecting an option for the fifth screen in the fourth screen. The normal screen transition rule defined in the first rule table TL11b includes a rule that causes, with the fourth screen displayed in the display unit 13, a display screen of the display unit 13 to transition from the fourth screen to the sixth screen by the display controller 112 in response to a signal input in accordance with a fifth action by the user. Herein, the fifth action differs from the fourth action and may be, for example, an action of selecting an option for the sixth screen in the fourth screen. The fourth screen may be, for example, the menu A screen described in English or the menu B screen described in English. For example, when the fourth screen is the menu A screen described in English, the fifth screen may be the menu A1 screen described in English. For example, when the fourth screen is the menu B screen described in English, the fifth screen may be the menu B1 screen described in English. Further, for example, when the fourth screen is the menu A screen described in English, the sixth screen may be the menu A2 screen described in English. For example, when the fourth screen is the menu B screen described in English, the sixth screen may be the menu B2 screen described in English.

In the configuration above, if the designation unit 111 designates any rule table of the second rule tables TL12a to TL12d, display screen transitions are executed as in the simple screen transition rule shown in FIGS. 6 and 9. Moreover, in the configuration above, if the designation unit 111 designates any rule table of the third rule tables TL13a to TL13d, display screen transitions are executed as in the all-screens sequential transition rule shown in FIGS. 7 and 10.

As described above, one screen transition rule of a plurality of screen transition rules is selectively designated for each language, so that a hierarchical structure for display screen transition can be simplified or eliminated. This achieves similar effects to those of the embodiment above. Also, in design and development stage of the colorimeter 1, all the screens can be thoroughly, efficiently checked for each language. This can enable, for example, easy, efficient check of a malfunction such as character information extending beyond a target area of description due to differences in word and sentence lengths caused by replacement of languages. Consequently, the work and the time required for modification associated with replacement of languages can be reduced.

<(2-2) Second Modification>

Although a rule table designated by the designation unit 111 is changed simply in accordance with the selection of language in the first modification, the present invention is not limited thereto. For example, when the designation unit 111 designates any one of the third rule tables TL13a to TL13d, a display screen may be caused to transition between screens describing the same contents in different languages in accordance with a preset action by the user. Specifically, the designation unit 111 may change the rule table designated from among the third rule tables TL13a to TL13d in accordance with the preset action by the user.

In this case, for example, when a screen in a first language is displayed, a display screen is caused to transition such that all screens Gp1 in the first language are displayed sequentially in response to a third action by the user. Herein, for example, when the all screens Gp1 in the first language are associated with a first order, a display screen transitions in accordance with the first order every time the user performs the third action. The display screen accordingly transitions such that the all screens Gp1 in the first language are displayed sequentially. The third action may be a predetermined action set in advance. The predetermined action may be, for example, an action of pressing the DOWN button 1252. The first language may be, for example, Japanese.

For example, when a screen in a second language is displayed, a display screen is caused to transition such that all screens Gp2 in the second language are displayed sequentially in response to the third action by the user. Herein, for example, when the all screens Gp2 in the second language are associated with the first order, a display screen transitions in accordance with the first order every time the user performs the third action. The display screen accordingly transitions such that the all screens Gp2 in the second language are displayed sequentially. The second language may be, for example, English.

When a screen in a third language is displayed, a display screen is caused to transition such that all screens Gp3 in the third language are displayed sequentially in response to the third action by the user. Herein, for example, when the all screens Gp3 in the third language are associated with the first order, a display screen transitions in accordance with the first order every time the user performs the third action. The display screen accordingly transitions such that the all screens Gp3 in the third language are displayed sequentially. The third language may be, for example, Chinese.

For example, when a screen in a fourth language is displayed, a display screen is caused to transition such that all screens Gp4 in the fourth language are displayed sequentially in response to the third action by the user. Herein, for example, when the all screens Gp4 in the fourth language are associated with the first order, a display screen transitions in accordance with the first order every time the user performs the third action. The display screen accordingly transitions such that the all screens Gp4 in the fourth language are displayed sequentially. The fourth language may be, for example, German.

When one screen for one type of contents is displayed, a display screen is caused to transition in response to a specific action by the user such that the screens in all the languages for one type of contents are displayed sequentially. Herein, for example, when the screens in all the languages for one type of contents are associated with a third order, a display screen transitions in accordance with the third order every time the user performs the specific action. The display screen accordingly transitions such that the screens in all the languages for one type of contents are displayed sequentially. The specific action may be a preset action and may be, for example, an action of pressing the RIGHT button 1254. Herein, for example, when the screens in all the languages for one type of contents are associated with a fourth order reverse to the third order, a display screen transitions in accordance with the fourth order every time the user performs another specific action. The display screen accordingly transitions such that the screens in all the languages for one type of contents are displayed sequentially. The other specific action may be a predetermined action set in advance and may be, for example, an action of pressing the LEFT button 1253.

Specifically, for example, with any one screen of a first screen group Gr1 for the same contents, which includes the first screen and the fourth screen, displayed, a display screen transitions in response to a specific action by the user such that two or more screens constituting the first screen group Gr1 are displayed sequentially. Conceivable examples of the way in which two or more screens are sequentially displaying include a way in which two or more screens are repeatedly displayed in a circulating manner and a way in which two or more screens are repeatedly displayed in a reciprocating manner. For example, with any one screen of a second screen group Gr2 for the same contents, which includes a second screen and a fifth screen, displayed, a display screen transitions in response to a specific action by the user such that two or more screens constituting the second screen group Gr2 are displayed sequentially. Moreover, for example, with any one screen of a third screen group Gr3 for the same contents, which includes a third screen and a sixth screen, displayed, a display screen transitions in response to the specific action by the user such that two or more screens constituting the third screen group Gr3 are displayed sequentially.

Figure 22:
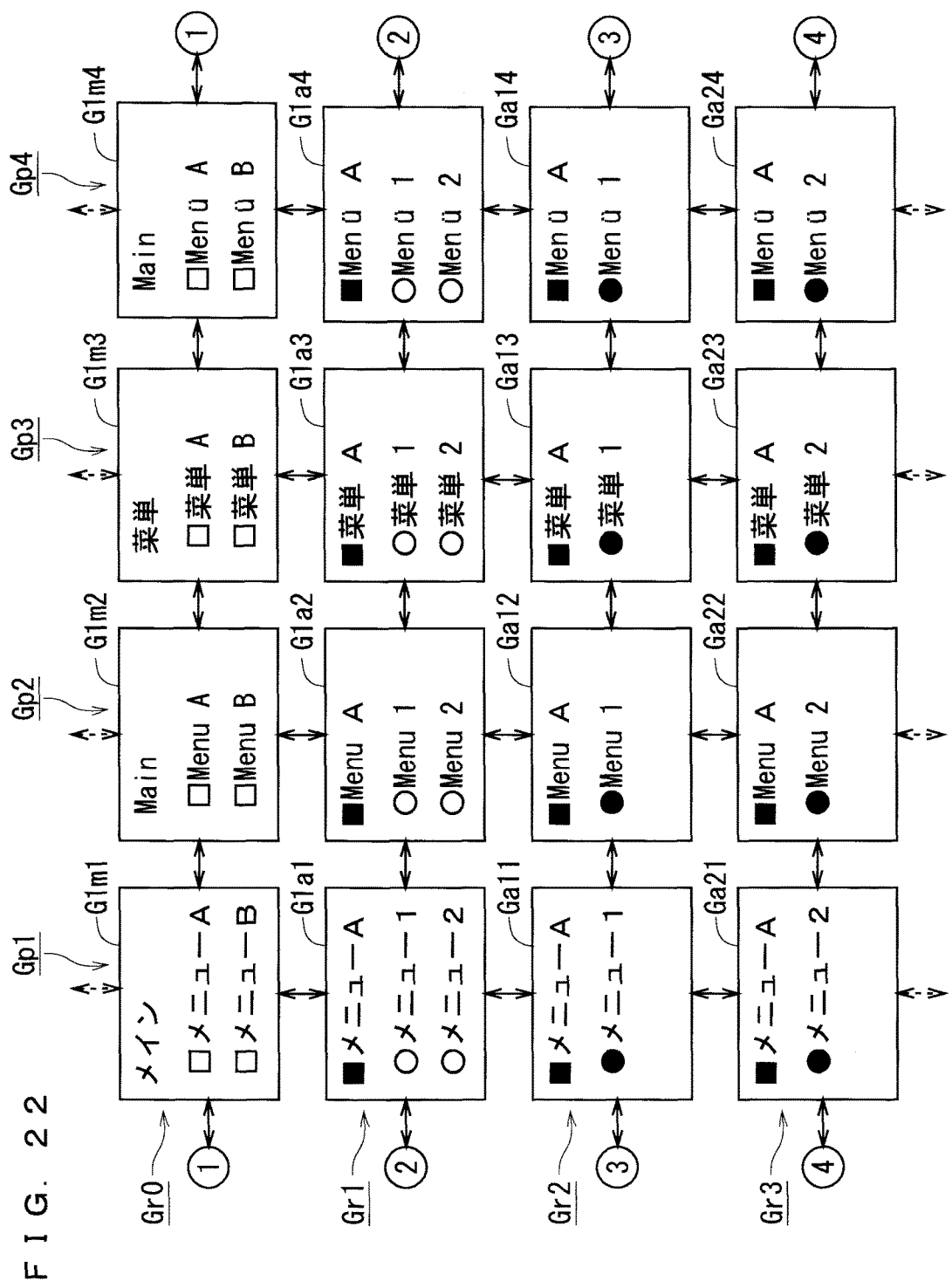
FIG. 22 shows an example of how a display screen transitions according to a second modification.

FIG. 22 shows an example of how a display screen transitions according to a second modification. FIG. 22 shows that a transition from a screen positioned at a start point of a solid arrow to a screen positioned at an end point of the solid arrow can be performed. Also, a dashed arrow indicates that a screen transition via another screen (not shown) can be performed.

As shown in FIG. 22, the all-screens sequential transition rule in a first language includes, for example, a rule that causes a display screen of the display unit 13 to transition from a first screen to a second screen by the display controller 112 in response to a signal input in accordance with the third action of the user. For example, when the first screen is a menu A screen G1a1 in Japanese as the first language, the second screen is a menu A1 screen Ga11 in Japanese as the first language. Further, the all-screens sequential transition rule in the first language includes a rule that causes a display screen of the display unit 13 to transition from the second screen to a third screen by the display controller 112 in response to a signal input in accordance with the third action by the user. For example, when the second screen is the menu A1 screen Ga11 in Japanese as the first language, the third screen is a menu A2 screen Ga21 in Japanese as the first language.

For example, the all-screens sequential transition rule in a second language includes, for example, a rule that causes a display screen of the display unit 13 to transition from a fourth screen to a fifth screen by the display controller 112 in response to a signal input in accordance with the third action by the user. The fourth screen is a screen based on fourth screen data, and the fifth screen is a screen based on fifth screen data. For example, when the fourth screen is a menu A screen G1*a*2 in English as the second language, the fifth screen is a menu A1 screen Ga12 in English as the second language. Further, the all-screens sequential transition rule in the second language includes a rule that causes a display screen of the display unit 13 to transition from the fifth screen to the sixth screen by the display controller 112 in response to a signal input in accordance with a third action by the user. The sixth screen is a screen based on sixth screen data. For example, when the fifth screen is the menu A1 screen Ga12 in English as the second language, the sixth screen is a menu A2 screen Ga22 in English as the second language.

For example, the all-screens sequential transition rules in the first to fourth languages include a rule that causes a display screen to transition in response to a signal input in accordance with a specific action of the user such that two or more screens of a screen group Gr0, which includes the main screens G1*m*1 to G1*m*4 in the first to fourth languages, are displayed sequentially. Herein, the specific action of the user may be a preset action. For example, when the main screens G1*m*1 to G1*m*4 are displayed sequentially in the stated order, the specific action may be an action of pressing the RIGHT button 1254. For example, when the main screens G1*m*1 to G1*m*4 are displayed sequentially in an order reverse to the order above, the action of the user may be an action of pressing the LEFT button 1253.

For example, the all-screens sequential transition rules in the first to fourth languages include a rule that causes a display screen to transition in response to a signal input in accordance with an action of the user such that two or more screens of a screen group Gr1, which includes menu A screens G1*a*1 to G1*a*4 in the first to fourth languages, are displayed sequentially. For example, the all-screens sequential transition rules in the first to fourth languages include a rule that causes a display screen to transition in response to a signal input in accordance with an action of the user such that two or more screens of the screen group Gr2, which includes menu A1 screens Ga11 to Ga14 in the first to fourth languages, are displayed sequentially. For example, the all-screens sequential transition rules in the first to fourth languages include a rule that causes a display screen to transition in response to a signal input in accordance with an action of the user such that two or more screens of a screen group Gr3, which includes menu A2 screens Ga21 to Ga24 in the first to fourth languages, are displayed sequentially.

As described above, in the colorimeter 1 as a display device according to the second modification, for example, when a normal screen transition rule is designated selectively, screen transition is performed between a plurality of screens constituting each of a plurality of groups, where the plurality of screens are layered to be dendritically associated. A plurality of screens constituting each group are, for example, a plurality of screens described in various languages. For example, when an all-screens sequential transition rule is designated selectively, a plurality of screens constituting each group are displayed sequentially in accordance with a predetermined action by the user. Further, screen transition is performed in which corresponding screens are displayed sequentially between a plurality of groups in accordance with a specific action by the user. The corresponding screens are, for example, screen showing the same contents. Switching can be made between a state in which display screen transition is performed in accordance with the normal screen transition rule and a state in which display screen transition is performed in accordance with the all-screens sequential transition rule. This allows the user to recognize the corresponding screens while comparing them. Thus, for example, a malfunction caused by replacement of languages can be checked more easily and efficiently on each screen. This further reduces the work and the time required for modification associated with replacement of languages.

<(2-3) Other Modifications>

Although a plurality of screens are dendritically associated so as to constitute three hierarchies in the normal screen transition rule in the embodiment and modifications above, the present invention is not limited thereto. For example, a plurality of screens may be dendritically associated so as to constitute two hierarchies, or a plurality of screens may be dendritically associated so as to constitute four or more hierarchies. In other words, in the normal screen transition rule, a plurality of screens may be dendritically associated so as to constitute two or more hierarchies.

In this case, the normal screen transition rule includes a rule that causes, with one screen of one hierarchy of two or more hierarchies displayed in the display unit 13, a display screen of the display unit 13 to transition to a screen of a hierarchy immediately therebelow by the display controller 112 in response to a signal input in accordance with an action of the user. That is to say, the normal screen transition rule includes a rule that causes a transition from one screen based on the screen data of one hierarchy to another screen based on the screen data of another hierarchy immediately below the one hierarchy of two or more hierarchies. The normal screen transition rule includes a rule that causes, with one screen of one hierarchy of two or more hierarchies displayed in the display unit 13, a display screen of the display unit 13 to transition to a screen of a hierarchy immediately thereabove by the display controller 112 in response to a signal input in accordance with an action of the user. That is to say, the normal screen transition rule includes a rule that causes a transition from one screen based on screen data of one hierarchy to another screen based on screen data of another hierarchy immediately above the one hierarchy of two or more hierarchies.

Although all the screens belonging to one hierarchy in the normal screen transition rule are incorporated into a hierarchy above the one hierarchy in the simple screen transition rule and the all-screens sequential transition rule in the embodiment and modifications above, the present invention is not limited thereto. For example, at least part of the screens belonging to one hierarchy in the normal transition rule may be incorporated into a hierarchy above the one hierarchy.

Although any one rule table of the first to third rule tables TL11 to TL13 is selectively designated depending on whether the buttons 123 and 124 are pressed when the button 121 is pressed in the embodiment and modifications above, the present invention is not limited thereto. The designation unit 111 may designate any one rule table of the first to third rule tables TL11 to TL13 in response to the selection of an option on the display screen.

Although a display screen transition is performed in response to pressing of the cross button 125 in the embodiment and modifications above, the present invention is not limited thereto. For example, a display screen transition may be performed in response to pressing of another button, in place of pressing the cross button 125. Alternatively, for example, a display screen transition may be performed in response to the selection of an option on the display screen, in place of pressing the cross button 125. Examples of the options include "next," "back," "return," "next language," and "previous language."

Although in response to a signal input in accordance with the operation performed on the operation unit 12 by the user, a rule table is selectively designated and a display screen transition is performed in the embodiment and modifications above, the present invention is not limited thereto. For example, as shown in FIG. 23, the display unit 13 may be changed to a display unit 13A including an operation unit 12A that outputs a signal corresponding to an action of the user to the microcomputer unit 11. This can allow the operation unit 12A to output a signal corresponding to an action of the user to the designation unit 111 and the display controller 112. Such a display unit 13A may be, for example, a liquid crystal display with a touch panel. The use of such a configuration eliminates the need for providing an operation unit 12 separately from the display unit 13A, further downsizing the colorimeter 1 as a display device. The provision of the operation unit 12 separately from the display unit 13 as in the embodiment and modifications above, however, downsizes the display unit 13.

Although a signal is input in accordance with the operation of the user for the operation unit 12 and the display unit 13A in the embodiment and modifications above, the present invention is not limited thereto. For example, a configuration in which signals are output to the microcomputer unit 11 in response to various actions such as user's voice may be employed. Such a configuration is conceivably, for example, a configuration in which a signal is output through voice recognition.

Although rules that cause display screen transition are defined in the first to third rule tables TL11 to TL13, TL11a to TL13a, TL11b to TL13b, TL11c to TL13c, and TL11d to TL13d in the embodiment and modifications above, the present invention is not limited thereto. For example, each rule may be described in any other way in which a table is not used.

Although the normal screen transition rule, the simple screen transition rule, and the all-screens sequential transition rule are employed in the embodiment and modifications above, the present invention is not limited thereto. For example, any one of the simple screen transition rule and the all-screens sequential transition rule may be employed.

Although the description has been made on the colorimeter 1 as a display device in the embodiment and modifications above, the display device according to the present invention is applicable to electronic devices equipped with a small display in general, such as a portable music player and an IC recorder.

It should be appreciated that all or part of the embodiment and various modifications set forth above can appropriately be combined with one another unless any contradiction occurs.

DESCRIPTION OF SYMBOLS 1 colorimeter
10 control unit
11 microcomputer unit
111 designation unit
112 display controller
11c processor
11s storage
12, 12A operation units
13, 13A display units
G1m, G1m1 to G1m4 main screens
Ga1, Ga11 to Ga14 menu A1 screens
Ga2, Ga21 to Ga24 menu A2 screens
Gb1 menu B1 screen
Gb2 menu B2 screen
Gp1 to Gp4 all screens
Gr1 to Gr3 first to third screen groups
PG1 program
TL1 rule table
TL11, TL11a to TL11d first rule tables
TL12, TL12a to TL12d second rule tables
TL13, TL13a to TL13d third rule tables

The invention claimed is:

1. A display device comprising:
a display unit;
a storage that stores a plurality of pieces of screen data and information indicative of a plurality of screen transition rules including a first screen transition rule and a second screen transition rule;
a designation unit that designates, in response to a signal input in accordance with an action of a user, one screen transition rule of the plurality of screen transition rules; and
a display controller that causes, in response to a signal input in accordance with an action of the user, causes a screen displayed in the display unit to transition from a screen based on one piece of screen data of the plurality of pieces of screen data to a screen based on another piece of screen data different from the one piece of screen data on the basis of the one screen transition rule designated by the designation unit, wherein
the plurality of pieces of screen data include first screen data, second screen data, and third screen data,
the first screen transition rule includes (1a) a rule that causes, with a first screen based on the first screen data displayed in the display unit, a screen displayed in the display unit to transition from the first screen to a second screen based on the second screen data by the display controller in response to a signal input in accordance with a first action by the user, and (1b) a rule that causes, with the first screen displayed in the display unit, a screen displayed in the display unit to transition from the first screen to a third screen based on the third screen data by the display controller in response to a signal input in accordance with a second action different from the first action by the user, and
the second screen transition rule includes (2a) a rule that causes, with the first screen displayed in the display unit, a screen displayed in the display unit to transition from the first screen to the second screen by the display controller in response to a signal input in accordance with a third action by the user, and (2b) a rule that causes, with the second screen displayed in the display unit, a screen displayed in the display unit to transition from the second screen to the third screen by the display controller in response to a signal input in accordance with the third action by the user.

2. The display device according to claim 1, wherein the first screen transition rule includes (1c) a rule that sets one screen of a top hierarchy of two or more hierarchies as a starting screen and causes, with one screen based on screen data of one hierarchy of the two or more hierarchies displayed in the display unit, a screen displayed in the display unit to transition from the one screen to another screen based on screen data of another hierarchy immediately below the one hierarchy of the two or more hierarchies by the display controller in response to a signal input in accordance with an action of the user, and the second screen transition rule includes (2c) a rule that causes a screen displayed in the display unit to transition by the display controller in response to a signal input in accordance with the third action by the user such that all screens based on all pieces of screen data belonging to the two or more hierarchies are displayed sequentially.

3. The display device according to claim 2, wherein the plurality of pieces of screen data include fourth screen data, fifth screen data, and sixth screen data, the first screen transition rule further includes (1d) a rule that causes, with a fourth screen based on the fourth screen data displayed in the display unit, a screen displayed in the display unit to transition from the fourth screen to a fifth screen based on the fifth screen data by the display controller in response to a signal input in accordance with a fourth action by the user, and (1e) a rule that causes, with the fourth screen displayed in the display unit, a screen displayed in the display unit to transition from the fourth screen to a sixth screen based on the sixth screen data by the display controller in response to a signal input in accordance with a fifth action different from the fourth action by the user, and the second screen transition rule includes (2d) a rule that causes, with the fourth screen displayed in the display unit, a screen displayed in the display unit to transition from the fourth screen to the fifth screen by the display controller in response to a signal input in accordance with the third action by the user, and (2e) a rule that causes, with the fifth screen displayed in the display unit, a screen displayed in the display unit to transition from the fifth screen to the sixth screen by the display controller in response to a signal input in accordance with the third action by the user, and further (2f) a rule that causes, with any one screen of a first screen group including the first screen and the fourth screen displayed in the display unit, a screen displayed in the display unit to transition by the display controller in response to a signal input in accordance with a preset action by the user such that two or more screens constituting the first screen group are displayed sequentially, (2q) a rule that causes, with any one screen of a second screen group including the second screen and the fifth screen displayed in the display unit, a screen displayed in the display unit to transition by the display controller in response to a signal input in accordance with a preset action by the user such that two or more screens constituting the second screen group are displayed sequentially, and (2h) a rule that causes, with any one screen of a third screen group including the third screen and the sixth screen displayed in the display unit, a screen displayed in the display unit to transition by the display controller in response to a signal input in accordance with a preset action by the user such that two or more screens constituting the third screen group are displayed sequentially.

4. The display device according to claim 3, wherein the display unit includes an operation unit that outputs a signal corresponding to an action of the user to the designation unit and the display controller.

5. The display device according to claim 4, comprising an operation unit that outputs a signal corresponding to an action of the user to the designation unit and the display controller.

6. The display device according to claim 2, wherein the display unit includes an operation unit that outputs a signal corresponding to an action of the user to the designation unit and the display controller.

7. The display device according to claim 6, comprising an operation unit that outputs a signal corresponding to an action of the user to the designation unit and the display controller.

8. The display device according to claim 2, comprising an operation unit that outputs a signal corresponding to an action of the user to the designation unit and the display controller.

9. The display device according to claim 1, wherein the plurality of pieces of screen data include fourth screen data, fifth screen data, and sixth screen data, the first screen transition rule further includes (1d) a rule that causes, with a fourth screen based on the fourth screen data displayed in the display unit, a screen displayed in the display unit to transition from the fourth screen to a fifth screen based on the fifth screen data by the display controller in response to a signal input in accordance with a fourth action by the user, and (1e) a rule that causes, with the fourth screen displayed in the display unit, a screen displayed in the display unit to transition from the fourth screen to a sixth screen based on the sixth screen data by the display controller in response to a signal input in accordance with a fifth action different from the fourth action by the user, and the second screen transition rule includes (2d) a rule that causes, with the fourth screen displayed in the display unit, a screen displayed in the display unit to transition from the fourth screen to the fifth screen by the display controller in response to a signal input in accordance with the third action by the user, and (2e) a rule that causes, with the fifth screen displayed in the display unit, a screen displayed in the display unit to transition from the fifth screen to the sixth screen by the display controller in response to a signal input in accordance with the third action by the user, and further (2f) a rule that causes, with any one screen of a first screen group including the first screen and the fourth screen displayed in the display unit, a screen displayed in the display unit to transition by the display controller in response to a signal input in accordance with a preset action by the user such that two or more screens constituting the first screen group are displayed sequentially, (2g) a rule that causes, with any one screen of a second screen group including the second screen and the fifth screen displayed in the display unit, a screen displayed in the display unit to transition by the display controller in response to a signal input in accordance with a preset action by the user such that two or more screens constituting the second screen group are displayed sequentially, and (2h) a rule that causes, with any one screen of a third screen group including the third screen and the sixth screen displayed in the display unit, a screen displayed in the display unit to transition by the display controller in response to a signal input in accordance with a preset action by the user such that two or more screens constituting the third screen group are displayed sequentially.

10. The display device according to claim 9, wherein the display unit includes an operation unit that outputs a signal corresponding to an action of the user to the designation unit and the display controller.

11. The display device according to claim 10, comprising an operation unit that outputs a signal corresponding to an action of the user to the designation unit and the display controller.

12. The display device according to claim 9, comprising an operation unit that outputs a signal corresponding to an action of the user to the designation unit and the display controller.

13. The display device according to claim 1, wherein the display unit includes
an operation unit that outputs a signal corresponding to an action of the user to the designation unit and the display controller.

14. The display device according to claim 13, comprising an operation unit that outputs a signal corresponding to an action of the user to the designation unit and the display controller.

15. The display device according to claim 1, comprising an operation unit that outputs a signal corresponding to an action of the user to the designation unit and the display controller.

16. A non-transitory computer readable recording medium storing a computer-readable program, the program controlling a display device to operate as one display device, and the one display device comprising:
a display unit;
a storage that stores a plurality of pieces of screen data and information indicative of a plurality of screen transition rules including a first screen transition rule and a second screen transition rule;
a designation unit that designates, in response to a signal input in accordance with an action of a user, one screen transition rule of the plurality of screen transition rules; and
a display controller that causes, in response to a signal input in accordance with an action of the user, causes a screen displayed in the display unit to transition from a screen based on one piece of screen data of the plurality of pieces of screen data to a screen based on another piece of screen data different from the one piece of screen data on the basis of the one screen transition rule designated by the designation unit, wherein
the plurality of pieces of screen data include first screen data, second screen data, and third screen data,
the first screen transition rule includes (1a) a rule that causes, with a first screen based on the first screen data displayed in the display unit, a screen displayed in the display unit to transition from the first screen to a second screen based on the second screen data by the display controller in response to a signal input in accordance with a first action by the user, and (1b) a rule that causes, with the first screen displayed in the display unit, a screen displayed in the display unit to transition from the first screen to a third screen based on the third screen data by the display controller in response to a signal input in accordance with a second action different from the first action by the user, and the second screen transition rule includes (2a) a rule that causes, with the first screen displayed in the display unit, a screen displayed in the display unit to transition from the first screen to the second screen by the display controller in response to a signal input in accordance with a third action by the user, and (2b) a rule that causes, with the second screen displayed in the display unit, a screen displayed in the display unit to transition from the second screen to the third screen by the display controller in response to a signal input in accordance with the third action by the user.

17. The non-transitory computer readable recording medium according to claim 16, wherein
the first screen transition rule includes (1c) a rule that sets one screen of a top hierarchy of two or more hierarchies as a starting screen and causes, with one screen based on screen data of one hierarchy of the two or more hierarchies displayed in the display unit, a screen displayed in the display unit to transition from the one screen to another screen based on screen data of another hierarchy immediately below the one hierarchy of the two or more hierarchies by the display controller in response to a signal input in accordance with an action of the user, and
the second screen transition rule includes (2c) a rule that causes a screen displayed in the display unit to transition by the display controller in response to a signal input in accordance with the third action by the user such that all screens based on all pieces of screen data belonging to the two or more hierarchies are displayed sequentially.

18. The non-transitory computer readable recording medium according to claim 16, wherein
the plurality of pieces of screen data include fourth screen data, fifth screen data, and sixth screen data,
the first screen transition rule further includes (1d) a rule that causes, with a fourth screen based on the fourth screen data displayed in the display unit, a screen displayed in the display unit to transition from the fourth screen to a fifth screen based on the fifth screen data by the display controller in response to a signal input in accordance with a fourth action by the user, and (1e) a rule that causes, with the fourth screen displayed in the display unit, a screen displayed in the display unit to transition from the fourth screen to a sixth screen based on the sixth screen data by the display controller in response to a signal input in accordance with a fifth action different from the fourth action by the user, and
the second screen transition rule includes
(2d) a rule that causes, with the fourth screen displayed in the display unit, a screen displayed in the display unit to transition from the fourth screen to the fifth screen by the display controller in response to a signal input in accordance with the third action by the user, and (2e) a rule that causes, with the fifth screen displayed in the display unit, a screen displayed in the display unit to transition from the fifth screen to the sixth screen by the display controller in response to a signal input in accordance with the third action by the user, and further
(2f) a rule that causes, with any one screen of a first screen group including the first screen and the fourth screen displayed in the display unit, a screen displayed in the display unit to transition by the display controller in response to a signal input in accordance with a preset action by the user such that two or more screens constituting the first screen group are displayed sequentially, (2g) a rule that causes, with any one screen of a second screen group including the second screen and the fifth screen displayed in the display unit, a screen displayed in the display unit to transition by the display controller in response to a signal input in accordance with a preset action by the user such that two or more screens constituting the second screen group are displayed sequentially, and (2h) a rule that causes, with any one screen of a third screen group including the third screen and the sixth screen displayed in the display unit, a screen displayed in the display unit to transition by the display controller in response to a signal input in accordance with a preset action by the user such that two or more screens constituting the third screen group are displayed sequentially.

19. The non-transitory computer readable recording medium according to claim 16, wherein the display unit includes an operation unit that outputs a signal corresponding to an action of the user to the designation unit and the display controller.

* * * * *